US010676651B2

(12) United States Patent
Kawasaki

(10) Patent No.: US 10,676,651 B2
(45) **Date of Patent: *Jun. 9, 2020**

(54) ADHESIVE FILM AND PROCESS FOR PRODUCING THE SAME

(71) Applicant: MITSUBISHI CHEMICAL CORPORATION, Chiyoda-ku (JP)

(72) Inventor: Taishi Kawasaki, Maibara (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/312,880

(22) PCT Filed: May 2, 2016

(86) PCT No.: PCT/JP2016/063560

§ 371 (c)(1), (2) Date: Nov. 21, 2016

(87) PCT Pub. No.: WO2017/154226

PCT Pub. Date: Sep. 14, 2017

(65) Prior Publication Data

US 2017/0283667 A1 Oct. 5, 2017

(30) Foreign Application Priority Data

Mar. 9, 2016 (JP) ................................ 2016-045416
Mar. 9, 2016 (JP) ................................ 2016-045417

(51) Int. Cl.

*C09J 11/08* (2006.01)
*B29C 48/21* (2019.01)

(Continued)

(52) U.S. Cl.

CPC ............... *C09J 11/08* (2013.01); *B29C 48/08* (2019.02); *B29C 48/154* (2019.02); *B29C 48/21* (2019.02); *C08G 63/6886* (2013.01); *C09J 5/00* (2013.01); *C09J 7/22* (2018.01); *C09J 7/38* (2018.01); *C09J 9/02* (2013.01); *C09J 133/06* (2013.01); *C09J 167/02* (2013.01); *C09J 201/00* (2013.01); *B05D 3/00* (2013.01); *B05D 3/007* (2013.01); *B05D 3/12* (2013.01); *B05D 5/10* (2013.01); *B05D 5/12* (2013.01); *B05D 7/04* (2013.01); *B05D 2502/00* (2013.01); *B29C 48/0018* (2019.02); *B29C 55/02* (2013.01); *B29K 2033/12* (2013.01); *B29K 2067/003* (2013.01); *B29K 2105/0097* (2013.01); *B32B 7/04* (2013.01); *B32B 27/08* (2013.01); *B32B 27/18* (2013.01); *B32B 27/20* (2013.01); *B32B 27/30* (2013.01); *B32B 27/308* (2013.01); *B32B 27/36* (2013.01); *B32B 2255/10* (2013.01); *B32B 2255/26* (2013.01); *B32B 2264/10* (2013.01); *B32B 2264/102* (2013.01); *B32B 2264/104* (2013.01); *B32B 2307/21* (2013.01); *B32B 2367/00* (2013.01); *B32B 2405/00* (2013.01); *C08J 5/18* (2013.01); *C08J 5/22* (2013.01); *C08J 5/2206* (2013.01); *C08J 5/2218* (2013.01); *C08J 5/2256* (2013.01); *C08J 7/04* (2013.01); *C08J 7/042* (2013.01); *C08J 7/044* (2020.01); *C08J 7/0427* (2020.01); *C08K 3/013* (2018.01); *C08K 3/014* (2018.01); *C08K 3/017* (2018.01); *C08K 3/22* (2013.01); *C08K 3/26* (2013.01); *C08K 3/346* (2013.01); *C08K 3/36* (2013.01); *C08K 5/00* (2013.01); *C08K 5/0025* (2013.01); *C08K 5/0075* (2013.01); *C08K 5/1515* (2013.01); *C08K 5/1535* (2013.01); *C08K 5/16* (2013.01); *C08K 5/24* (2013.01);

(Continued)

(58) Field of Classification Search

None

See application file for complete search history.

(56) References Cited

U.S. PATENT DOCUMENTS 4,699,843 A * 10/1987 Charbonneau ......... C09J 133/08 428/355 AC
4,820,745 A * 4/1989 Muller .................. C08G 18/42 522/90

(Continued)

FOREIGN PATENT DOCUMENTS

CN 102575132 7/2012
CN 103173165 6/2013

(Continued)

OTHER PUBLICATIONS

Werner, Eberhard et al., "Polyesters, Films." Encyclopedia of Polymer Science and Engineering, vol. 12 (1988), pp. 193-216. (Year: 1988).*

(Continued)

*Primary Examiner* — Vivian Chen
(74) *Attorney, Agent, or Firm* — Nixon & Vanderhye P.C.

(57) ABSTRACT

The present invention provides an adhesive film hardly suffering from fisheyes and deposition of dirt and dusts thereonto and having excellent mechanical strength and heat resistance as well as good adhesion properties, which can be suitably used as various surface protective films, etc. The present invention relates to an adhesive film comprising a polyester film and an adhesive layer formed on at least one surface of the polyester film, in which the adhesive layer comprises a resin having a glass transition point of not higher than 0° C., and an antistatic agent, and a thickness of the adhesive layer is not more than 10 μm.

27 Claims, No Drawings

(51) Int. Cl.

| | |
|---|---|
| ***C09J 7/38*** | (2018.01) |
| ***C09J 7/22*** | (2018.01) |
| ***C09J 201/00*** | (2006.01) |
| ***C09J 133/06*** | (2006.01) |
| ***C08G 63/688*** | (2006.01) |
| ***B29C 48/154*** | (2019.01) |
| ***B29C 48/08*** | (2019.01) |
| ***C09J 5/00*** | (2006.01) |
| ***C09J 9/02*** | (2006.01) |
| ***C09J 167/02*** | (2006.01) |
| ***B29C 48/00*** | (2019.01) |
| ***B32B 27/30*** | (2006.01) |
| ***B32B 27/36*** | (2006.01) |
| ***B32B 7/04*** | (2019.01) |
| ***B32B 27/18*** | (2006.01) |
| ***B32B 27/08*** | (2006.01) |
| ***B32B 27/20*** | (2006.01) |
| ***C08J 5/18*** | (2006.01) |
| ***C08J 5/22*** | (2006.01) |
| ***C08J 7/04*** | (2020.01) |
| ***C08J 7/044*** | (2020.01) |
| ***C08L 33/12*** | (2006.01) |
| ***C08L 33/04*** | (2006.01) |
| ***C08L 33/08*** | (2006.01) |
| ***C08L 33/06*** | (2006.01) |
| ***C08L 33/10*** | (2006.01) |
| ***C09D 7/40*** | (2018.01) |
| ***C09D 133/10*** | (2006.01) |
| ***C09D 133/12*** | (2006.01) |
| ***C09D 7/41*** | (2018.01) |
| ***C09D 7/48*** | (2018.01) |
| ***C09D 133/04*** | (2006.01) |
| ***C09D 133/06*** | (2006.01) |
| ***C09D 133/08*** | (2006.01) |
| ***C09D 7/43*** | (2018.01) |
| ***B29C 55/02*** | (2006.01) |
| ***C09J 133/08*** | (2006.01) |
| ***C09J 133/12*** | (2006.01) |
| ***C09J 133/10*** | (2006.01) |
| ***C09J 133/04*** | (2006.01) |
| ***B05D 3/12*** | (2006.01) |
| ***B05D 5/10*** | (2006.01) |
| ***B05D 3/00*** | (2006.01) |
| ***B05D 7/04*** | (2006.01) |
| ***B05D 5/12*** | (2006.01) |
| ***C08K 3/013*** | (2018.01) |
| ***C08K 3/22*** | (2006.01) |
| ***C08K 3/36*** | (2006.01) |
| ***C08K 3/014*** | (2018.01) |
| ***C08K 3/26*** | (2006.01) |
| ***C08K 3/32*** | (2006.01) |
| ***C08K 5/00*** | (2006.01) |
| ***C08K 5/16*** | (2006.01) |
| ***C08K 5/1515*** | (2006.01) |
| ***C08K 3/017*** | (2018.01) |
| ***C08K 5/29*** | (2006.01) |
| ***C08K 5/541*** | (2006.01) |
| ***C08K 5/3492*** | (2006.01) |
| ***C08K 3/30*** | (2006.01) |
| ***C08K 5/3412*** | (2006.01) |
| ***C08K 5/24*** | (2006.01) |
| ***C08K 3/34*** | (2006.01) |
| ***C08K 5/54*** | (2006.01) |
| ***C08K 5/1535*** | (2006.01) |
| ***B29K 33/00*** | (2006.01) |
| ***B29K 67/00*** | (2006.01) |
| ***B29K 105/00*** | (2006.01) |
| *C09D 179/02* | (2006.01) |
| *C09J 179/00* | (2006.01) |
| *C09J 179/04* | (2006.01) |
| *C09J 179/06* | (2006.01) |
| *C09J 163/00* | (2006.01) |
| *C09D 179/04* | (2006.01) |
| *C09D 163/00* | (2006.01) |
| *C09D 179/00* | (2006.01) |
| *C09D 179/06* | (2006.01) |
| *C09J 179/02* | (2006.01) |

(52) U.S. Cl.

CPC .............. *C08K 5/29* (2013.01); *C08K 5/3412* (2013.01); *C08K 5/3492* (2013.01); *C08K 5/34922* (2013.01); *C08K 5/54* (2013.01); *C08K 5/541* (2013.01); *C08K 2003/2206* (2013.01); *C08K 2003/2227* (2013.01); *C08K 2003/2237* (2013.01); *C08K 2003/2241* (2013.01); *C08K 2003/262* (2013.01); *C08K 2003/265* (2013.01); *C08K 2003/267* (2013.01); *C08K 2003/3045* (2013.01); *C08K 2003/326* (2013.01); *C08L 33/04* (2013.01); *C08L 33/06* (2013.01); *C08L 33/08* (2013.01); *C08L 33/10* (2013.01); *C08L 33/12* (2013.01); *C08L 2201/04* (2013.01); *C08L 2201/08* (2013.01); *C08L 2201/52* (2013.01); *C09D 7/40* (2018.01); *C09D 7/41* (2018.01); *C09D 7/43* (2018.01); *C09D 7/48* (2018.01); *C09D 133/04* (2013.01); *C09D 133/06* (2013.01); *C09D 133/08* (2013.01); *C09D 133/10* (2013.01); *C09D 133/12* (2013.01); *C09D 163/00* (2013.01); *C09D 179/00* (2013.01); *C09D 179/02* (2013.01); *C09D 179/04* (2013.01); *C09D 179/06* (2013.01); *C09J 133/04* (2013.01); *C09J 133/08* (2013.01); *C09J 133/10* (2013.01); *C09J 133/12* (2013.01); *C09J 163/00* (2013.01); *C09J 179/00* (2013.01); *C09J 179/02* (2013.01); *C09J 179/04* (2013.01); *C09J 179/06* (2013.01); *C09J 2201/622* (2013.01); *C09J 2205/102* (2013.01); *C09J 2433/00* (2013.01); *C09J 2433/006* (2013.01); *C09J 2467/00* (2013.01); *C09J 2467/006* (2013.01); *C09J 2481/00* (2013.01); *Y10T 428/265* (2015.01); *Y10T 428/2852* (2015.01); *Y10T 428/2878* (2015.01); *Y10T 428/2891* (2015.01); *Y10T 428/31797* (2015.04)

(56) References Cited

U.S. PATENT DOCUMENTS 5,064,717 A 11/1991 Suzuki et al.
5,068,689 A 11/1991 Sasa et al.
5,145,718 A 9/1992 Pedginski et al.
5,391,429 A * 2/1995 Otani .................... B29C 55/026 428/201
5,391,472 A * 2/1995 Muys ........................ C09K 3/16 430/496
5,554,217 A * 9/1996 B abler .................... C08K 3/34 106/494
5,643,676 A 7/1997 Dobashi et al.
5,744,538 A * 4/1998 Miller .................. C08G 63/688 524/539
5,866,248 A 2/1999 Dressler

(56) References Cited

U.S. PATENT DOCUMENTS 5,948,546 A * 9/1999 Bafford .................. B32B 27/30 156/326
6,057,041 A 5/2000 Sumi et al.
6,254,954 B1 * 7/2001 Bennett ................. C09J 167/00 428/41.8
6,428,900 B1 * 8/2002 Wang .................... C09J 167/00 428/481
6,582,789 B1 6/2003 Sumi
6,913,642 B2 * 7/2005 Grandidier .......... C09B 67/0001 106/410
6,921,580 B2 * 7/2005 Akatsu .................. C08J 7/0427 428/480
7,641,967 B2 * 1/2010 Shinohara ................. C09J 7/22 428/355 AC
8,247,503 B2 * 8/2012 Saiki ........................ B32B 7/12 525/504
8,664,309 B2 * 3/2014 Miyako ................... G02B 5/22 524/255
8,980,431 B2 * 3/2015 Mori ....................... G02B 1/10 428/423.1
9,657,197 B2 * 5/2017 Higashi ................. C09J 133/14
2001/0055678 A1 * 12/2001 Murata ..................... C09J 7/38 428/346
2002/0008381 A1 * 1/2002 Hare ..................... B41M 5/035 283/117
2002/0110647 A1 * 8/2002 Gust ....................... B05D 3/12 427/558
2002/0155244 A1 * 10/2002 Sakurai ..................... C09J 7/38 428/40.1
2002/0164477 A1 11/2002 Lonc et al.
2003/0008162 A1 * 1/2003 Oya ...................... C08K 5/353 428/480
2003/0049441 A1 3/2003 Samukawa
2003/0186040 A1 * 10/2003 Oya .......................... C08J 5/18 428/304.4
2004/0013892 A1 * 1/2004 Yano ...................... B32B 27/36 428/482
2004/0014883 A1 1/2004 Yamamoto et al.
2004/0067284 A1 4/2004 Sankey et al.
2004/0191509 A1 * 9/2004 Kishioka .................. B32B 7/10 428/354
2004/0213966 A1 * 10/2004 Peiffer ................... B32B 27/36 428/202
2004/0221945 A1 * 11/2004 Williams ............ B41M 5/0256 156/235
2005/0095536 A1 * 5/2005 Higgins ................ B41N 3/036 430/300
2005/0142370 A1 6/2005 Mussig
2005/0271882 A1 * 12/2005 Walther ............... C08F 255/02 428/423.1
2006/0033993 A1 * 2/2006 Sugino .................... C08K 5/07 359/487.02
2006/0035070 A1 * 2/2006 Kitazawa ................ C08J 7/047 428/323
2006/0154050 A1 * 7/2006 Fitch ........................ B32B 3/30 428/336
2006/0188711 A1 8/2006 Kishioka et al.
2006/0210768 A1 * 9/2006 Masuda ................. B29C 33/68 428/141
2007/0031660 A1 2/2007 Kanamaru et al.
2007/0036909 A1 * 2/2007 Luo ......................... B05D 7/04 427/532
2007/0190280 A1 * 8/2007 Harada ..................... C09J 5/08 428/40.1
2007/0281035 A1 12/2007 Griffith et al.
2008/0050583 A1 2/2008 Kubo
2008/0248299 A1 10/2008 Kuwahara et al.
2008/0281038 A1 11/2008 Takahashi et al.
2009/0018328 A1 * 1/2009 Nagata ................ C07D 487/22 540/127
2009/0022967 A1 * 1/2009 Inenaga ................... B32B 7/12 428/214
2009/0035567 A1 2/2009 Maruyama
2009/0104445 A1 * 4/2009 Inoue .................. C09D 133/26 428/355 N
2009/0229733 A1 9/2009 Kishioka et al.
2009/0239069 A1 9/2009 Yonehama et al.
2010/0048813 A1 * 2/2010 Clauss .................. C08G 63/12 524/604
2010/0188620 A1 7/2010 Kim et al.
2011/0045288 A1 2/2011 Koda et al.
2011/0051245 A1 3/2011 Masuda et al.
2011/0076475 A1 * 3/2011 Kim ......................... B32B 7/12 428/215
2011/0262753 A1 10/2011 Kawasaki et al.
2012/0064338 A1 * 3/2012 Niimi ........................ C09J 7/20 428/354
2012/0082853 A1 4/2012 Maeda et al.
2012/0094113 A1 4/2012 Kawasaki et al.
2012/0121918 A1 5/2012 Kawasaki et al.
2012/0135230 A1 5/2012 Hayashi et al.
2012/0202058 A1 8/2012 Takahira et al.
2012/0231688 A1 9/2012 Tosaki et al.
2013/0017397 A1 1/2013 Kouda et al.
2013/0020118 A1 * 1/2013 Ito ..................... C08G 18/6659 174/259
2013/0029146 A1 * 1/2013 Takashima ............. C09J 133/10 428/355 AC
2013/0045381 A1 2/2013 Nomura et al.
2013/0052457 A1 * 2/2013 Inui ...................... C08F 265/06 428/336
2013/0052466 A1 2/2013 Kato et al.
2013/0078471 A1 3/2013 Hiraki et al.
2013/0095325 A1 * 4/2013 Hiraki ............... C08G 18/0814 428/413
2013/0133743 A1 5/2013 Grah
2013/0158199 A1 6/2013 Iseki et al.
2013/0164540 A1 * 6/2013 Mori ....................... C08K 3/22 428/412
2013/0248118 A1 9/2013 Inui et al.
2013/0344288 A1 12/2013 Hayashi et al.
2014/0039128 A1 * 2/2014 Shigetomi ............. C09J 133/08 525/303
2014/0045319 A1 * 2/2014 Joo .......................... C08F 8/10 438/460
2014/0079949 A1 * 3/2014 Hanaki ................. C09J 133/14 428/355 AC
2014/0099504 A1 * 4/2014 Yoshida ................ C09J 133/04 428/355 AC
2014/0162057 A1 * 6/2014 Cho .......................... C09J 4/06 428/339
2014/0226085 A1 * 8/2014 Katami .............. G02F 1/13338 349/12
2014/0248490 A1 * 9/2014 Morimoto ............. C09J 133/00 428/355 AC
2014/0255690 A1 * 9/2014 Amano ...................... C09J 9/02 428/355 AC
2014/0272408 A1 * 9/2014 Amano ................. C09J 133/08 428/355 AC
2014/0295183 A1 10/2014 Yamagata et al.
2014/0363628 A1 * 12/2014 Nakai ...................... B32B 7/06 428/141
2015/0315361 A1 * 11/2015 Fujimaki ............... G02B 5/223 252/582
2015/0376477 A1 * 12/2015 Katami ................ G06F 3/0414 345/173
2016/0200072 A1 * 7/2016 Zama ....................... B32B 7/06 428/41.6
2016/0237287 A1 * 8/2016 Im ........................... C08J 7/047
2016/0280967 A1 * 9/2016 Ukei ..................... C09J 133/06
2016/0333142 A1 * 11/2016 Arcurio ............... C09D 11/104
2016/0362582 A1 * 12/2016 Kawasaki .............. C09J 7/0264
2017/0121567 A1 * 5/2017 Kawasaki .......... C08G 18/6229
2017/0283664 A1 * 10/2017 Kawasaki ................. C09J 5/00
2017/0283667 A1 10/2017 Kawasaki
2018/0127621 A1 * 5/2018 Kawasaki ............... C09J 7/385
2018/0208730 A1 7/2018 Kato et al.
2018/0223131 A1 8/2018 Kawasaki

(56) References Cited

U.S. PATENT DOCUMENTS

FOREIGN PATENT DOCUMENTS

| | | | | |
|---|---|---|---|---|
| CN | 104073196 | | | 10/2014 |
| EP | 1 213 319 | | | 6/2002 |
| EP | 2 258 551 | | | 12/2010 |
| EP | 2 561 985 | | | 2/2013 |
| JP | 60-127385 | | | 7/1985 |
| JP | 60-192631 | | | 10/1985 |
| JP | 05-98219 | | | 4/1993 |
| JP | 7-278505 | | | 10/1995 |
| JP | 2000-026817 | | | 1/2000 |
| JP | 2001-96698 | | | 4/2001 |
| JP | 2001-096698 | A | * | 4/2001 |
| JP | 2002-60707 | | | 2/2002 |
| JP | 2003-154616 | | | 5/2003 |
| JP | 2004-29204 | | | 1/2004 |
| JP | 2004-091577 | | | 3/2004 |
| JP | 2005-298641 | | | 10/2005 |
| JP | 2007-008985 | | | 1/2007 |
| JP | 2007-8985 | | | 1/2007 |
| JP | 2007-9109 | | | 1/2007 |
| JP | 2007-45913 | | | 2/2007 |
| JP | 2007-169458 | | | 7/2007 |
| JP | 2007-238766 | | | 9/2007 |
| JP | 2007-270005 | | | 10/2007 |
| JP | 2007-304425 | | | 11/2007 |
| JP | 2008-308539 | | | 12/2008 |
| JP | 2007-009109 | | | 1/2009 |
| JP | 2009-084477 | A | * | 4/2009 |
| JP | 2009-221440 | | | 10/2009 |
| JP | 2010-185016 | | | 8/2010 |
| JP | 2010-253715 | | | 11/2010 |
| JP | 2010-253715 | A | * | 11/2010 |
| JP | 2011-184642 | A | * | 9/2011 |
| JP | 2011-231203 | | | 11/2011 |
| JP | 2011-231203 | A | * | 11/2011 |
| JP | 2013-39802 | | | 2/2013 |
| JP | 2013-177603 | | | 9/2013 |
| JP | 2013-189562 | | | 9/2013 |
| JP | 2013-202962 | | | 10/2013 |
| JP | 2014-152303 | | | 8/2014 |
| JP | 2014-208741 | A | * | 11/2014 |
| JP | 2015-44970 | | | 3/2015 |
| JP | 2015-174933 | | | 10/2015 |
| JP | 2015-217557 | | | 12/2015 |
| JP | 2017-66411 | | | 4/2017 |
| KR | 10-2001-0101097 | | | 11/2001 |
| KR | 10-2008-0060604 | | | 7/2008 |
| KR | 10-2012-0006509 | | | 1/2012 |
| KR | 10-2015-0088112 | | | 7/2015 |
| WO | WO 2007/029298 | | | 3/2007 |
| WO | WO 2014/156344 | A | * | 10/2014 |

OTHER PUBLICATIONS

International Search Resort issued in PCT/JP2016/063560 dated Jul 19, 2016.

Office Action issued in U.S. Appl. No. 15/230,756 dated Sep. 28, 2018.

International Search Resort issued in PCT/JP2016/055204 dated May 24, 2016.

Written Opinion of the International Searching Authority issued in PCT/JP2016/055204 dated May 24, 2016.

International Search Report issued in Appln. No. PCT/JP2016/061810 dated May 31, 2016 (w/ translation).

KR Office Action issued in Appln. No. 10-2016-7022740 dated Jul. 30, 2018 (w/ translation).

KR Office Action issued in Appln. No. 10-2016-7028775 dated May 30, 2018 (w/ translation).

KR Office Action issued in Appln. No. 10-2016-7032398 dated Jul. 20, 2018 (w/ translation).

KR Office Action issued in Appln. No. 10-2018-7008453 dated Jun. 5, 2018 (translation only).

U.S. Office Action issued in U.S. Appl. No. 15/230,756 dated Sep. 27, 2017.

U.S. Office Action issued in U.S. Appl. No. 15/230,756 dated Jan. 11, 2018.

U.S. Office Action issued in U.S. Appl. No. 15/230,756 dated Apr. 17, 2018.

U.S. Office Action issued in U.S. Appl. No. 15/230,756 dated Jun. 19, 2018.

U.S. Office Action issued in U.S. Appl. No. 15/320,897 dated Sep. 18, 2017.

U.S. Office Action issued in U.S. Appl. No. 15/320,897 dated Jan. 11, 2018.

U.S. Office Action issued in U.S. Appl. No. 15/320,897 dated Apr. 17, 2018.

U.S. Office Action issued in U.S. Appl. No. 15/320,897 dated Jul. 11, 2018.

U.S. Office Action issued in U.S. Appl. No. 15/861,778 dated May 16, 2018.

International Preliminary Report on Patentability issued in PCT/JP2016/063560 dated Sep. 11, 2018.

Office Action issued in U.S. Appl. No. 15/861,778 dated Dec. 31, 2018.

Office Action issued in U.S. Appl. No. 15/941,066 dated Nov. 27, 2018.

Office Action issued in U.S. Appl. No. 15/230,756 dated Mar. 15, 2019.

Office Action issued in U.S. Appl. No. 15/941,066 dated Mar. 15, 2019.

Office Action issued in KR Appln. No. 10-2018-7028793 dated Dec. 19, 2018 (English translation).

Office Action issued in KR Appln. No. 10-2016-7028775 dated Dec. 27, 2018 (English translation).

Office Action issued in KR Appln. No. 10-2018-7008453 dated Dec. 27, 2018 (English translation).

International Search Report issued in PCT/JP2015/072741 dated Sep. 29, 2015.

Written Opinion of the International Searching Authority issued in PCT/JP2015/072741 dated Sep. 29, 2015.

Search Report issued in EP Appln. No. 15823582.0 dated Sep. 8, 2017.

Office Action issued in CN Appln. No. 201580001455.8 dated Dec. 18, 2018 (w/ translation).

Office Action issued in KR Appln. No. 10-2018-7028793 dated Jun. 20, 2019 (translation only).

Office Action issued in TW Appln. No. 105107038 dated Jun. 27, 2019 (translation only).

Office Action issued in U.S. Appl. No. 14/910,133 dated Jun. 30, 2017.

Office Action issued in U.S. Appl. No. 14/910,133 dated Nov. 30, 2017.

Office Action issued in U.S. Appl. No. 14/910,133 dated Jun. 1, 2018.

Office Action issued in U.S. Appl. No. 14/910,133 dated Nov. 19, 2018.

Office Action issued in U.S. Appl. No. 14/910,133 dated Apr. 8, 2019.

Office Action issued in U.S. Appl. No. 15/230,756 dated Sep. 27, 2017.

Office Action issued in U.S. Appl. No. 15/230,756 dated Jan. 11, 2018.

Office Action issued in U.S. Appl. No. 14/910,133 dated Sep. 5, 2019.

Office Action issued in U.S. Appl. No. 15/861,778 dated Aug. 13, 2019.

Office Action issued in CN Appln. No. 201580001455.8 dated Jun. 27, 2019 (translation only).

Office Action issued in U.S. Appl. No. 15/941,066 dated Sep. 25, 2019.

* cited by examiner

ADHESIVE FILM AND PROCESS FOR PRODUCING THE SAME

This application is the U.S. national phase of International Application No. PCT/JP2016/63560 filed 2 May 2016, which designated the U.S. and claims priority to JP Patent Application No. 2016-045416 filed 9 Mar. 2016, and JP Patent Application No. 2016-045417 filed 9 Mar. 2016, the entire contents of each of which are hereby incorporated by reference.

TECHNICAL FIELD

The present invention relates to an adhesive film and a process for producing the adhesive film, and more particularly, to an adhesive film hardly suffering from fisheyes and deposition of dirt and dusts thereonto and having excellent mechanical strength and heat resistance as well as good adhesion properties, which can be suitably used as a surface protective film, for example, for preventing formation of scratches or deposition of contaminants on resin plates, metal plates, etc., upon transportation, storage or processing thereof, and a process for producing the adhesion film.

BACKGROUND ART

Hitherto, surface protective films have been extensively used in the applications for preventing formation of scratches or deposition of contaminants on resin plates, metal plates, glass plates, etc., upon transportation, storage or processing thereof, preventing formation of scratches or deposition of dirt and dusts or contaminants on members used in electronics-related fields such as liquid crystal display panels and polarizing plates upon processing thereof, preventing deposition of contaminants on automobiles upon transportation or storage thereof or protecting automobile painting against acid rain, protecting flexible printed boards upon plating or etching treatments thereof, and the like.

It has been required that these surface protective films can exhibit an adequate adhesion strength to various kinds of adherends such as resin plates, metal plates and glass plates upon transportation, storage or processing thereof, can be attached onto these adherends to protect the surface thereof, and can be easily peeled off from the adherends after accomplishing the objects as aimed. In order to overcome these problems or tasks, the use of polyolefin-based films for the purpose of protecting the surface of the adherends has been proposed (Patent Literatures 1 and 2).

However, since the polyolefin-based films are used as a base material of the surface protective films, it is not possible to avoid occurrence of defects generally called fisheyes, i.e., formation of gels or deteriorated products derived from raw materials of the base material of the film. For example, there tends to arise such a problem that when testing the adherend onto which the surface protective film is kept attached, these defects on the surface protective film are detected as defects of the adherend, etc., thereby causing disturbance of the test.

In addition, the base material for the surface protective films is required to have a certain degree of mechanical strength to such an extent that the base material is free of expansion owing to a tensile force applied upon various processing steps such as lamination onto the adherend, etc. However, the polyolefin-based films are generally deteriorated in mechanical strength, so that there tends to occur such a problem that the films are unsuitable for undergoing high-tension processing steps in association with increase in film-processing velocity, etc., which must be conducted in view of the importance to productivity of the film.

Further, in the case where the processing temperature of the polyolefin-based films is increased for enhancing processing velocity or improving various properties thereof, the polyolefin-based films tend to suffer from deterioration in dimensional stability owing to poor shrink stability upon heating the films. For this reason, there is an increasing demand for films having not only less heat deformation but also excellent dimensional stability even when subjected to high-temperature processing.

In general, plastic films have drawbacks such as deposition of dirt and dusts thereon owing to generation of static electricity upon peeling or by friction (delamination electrification or frictional electrification). In particular, when the plastic films are used in the applications in which inclusion of foreign matters should be avoided, for example, as a protective film in the processes for production of optical members such as polarizing plates, significant problems tend to occur.

CITATION LIST

Patent Literatures

Patent Literature 1: Japanese Patent Application Laid-Open (KOKAI) No. 5-98219 (1993)

Patent Literature 2: Japanese Patent Application Laid-Open (KOKAI) No. 2007-270005

SUMMARY OF INVENTION

Technical Problem

The present invention has been attained to solve the above conventional problems. An object of the present invention is to provide an adhesive film hardly suffering from fisheyes and deposition of dirt and dust thereonto and having excellent mechanical strength and heat resistance as well as good adhesion properties, which can be suitably used as various surface protective films, etc.

Solution to Problem

As a result of the present inventors' earnest study in view of the above conventional problems, it has been found that these problems can be readily solved by using an adhesive film having a specific structure. The present invention has been attained on the basis of this finding.

That is, in a first aspect of the present invention, there is provided an adhesive film comprising a polyester film and an adhesive layer formed on at least one surface of the polyester film, in which the adhesive layer comprises a resin having a glass transition point of not higher than 0° C. and an antistatic agent, and a thickness of the adhesive layer is not more than 10 μm.

Further, in a second aspect of the present invention, there is provided a process for producing an adhesive film, comprising the steps of:

providing a coating layer on at least one surface of a polyester film to prepare a coated film, in which the coating layer comprises a resin having a glass transition point of not higher than 0° C. and an antistatic agent; and drawing the coated film in at least one direction thereof.

Technical Effects of Invention

In accordance with the present invention, it is possible to provide an adhesive film hardly suffering from fisheyes and deposition of dirt and dusts thereonto and having excellent mechanical strength and heat resistance as well as good adhesion properties, which can be suitably used as various surface protective films. Therefore, the present invention has a high industrial value.

DETAILED DESCRIPTION OF THE INVENTION

In order to achieve the above objects, i.e., reduction of formation of fisheyes in the film and improvement in mechanical strength and heat resistance of the film, it has been considered to be necessary that a fundamental material of the base film is largely changed to other materials. As a result of various studies made based on the consideration, it has been found that the above objects can be achieved by using a polyester-based material that is largely different from the conventionally used polyolefin-based materials. However, when the material of the base film is largely changed as described above, the resulting film tends to be considerably deteriorated in adhesion properties. Thus, general polyester films have failed to attain satisfactory results. In consequence, it has been contemplated to improve properties of the film by providing an adhesive layer on the base film. As a result, the present invention has been attained based on the improvement.

The polyester film constituting the adhesive film may have either a single layer structure or a multilayer structure. Unless departing from the scope of the present invention, the polyester film may have not only a two or three layer structure but also a four or more multilayer structure, and the layer structure of the polyester film is not particularly limited. The polyester film preferably has a two or more multilayer structure to impart specific characteristics to the respective layers and thereby contemplate providing a multi-functionalized film.

The polyester used in the present invention may be in the form of either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate or the like. On the other hand, as a dicarboxylic acid component of the copolyester, there may be mentioned at least one compound selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the copolyester, there may be mentioned at least one compound selected from the group consisting of ethylene glycol, diethylene glycol, propylene glycol, butanediol, 4-cyclohexanedimethanol and neopentyl glycol.

From the standpoint of producing a film capable of withstanding various processing conditions, the polyester film is preferably enhanced in mechanical strength and heat resistance (dimensional stability upon heating). For this reason, it may be preferred that the polyester film comprises a less amount of a copolyester component. More specifically, the content of monomers forming the copolyester in the polyester film is usually in the range of not more than 10 mol %, preferably not more than 5 mol %, and more preferably not more than 3 mol % which may be the same extent as a content of a diether component produced as a by-product upon polymerization for production of a homopolyester. The configuration of the polyester is preferably a film formed of polyethylene terephthalate prepared by polymerizing terephthalic acid and ethylene glycol among the aforementioned compounds, or polyethylene naphthalate, in view of good mechanical strength and heat resistance of the film, and more preferably a film formed of polyethylene terephthalate in view of facilitated production of the film and good handling properties of the film when used in the applications such as a surface protective film.

The polymerization catalyst for production of the polyester is not particularly limited, and any conventionally known compounds may be used as the polymerization catalyst. Examples of the polymerization catalyst include an antimony compound, a titanium compound, a germanium compound, a manganese compound, an aluminum compound, a magnesium compound and a calcium compound. Of these compounds, the antimony compound is preferred in view of inexpensiveness. In addition, the titanium compound or the germanium compound is also preferably used because they exhibit a high catalytic activity, and are capable of conducting the polymerization even when used in a small amount, and enhancing transparency of the obtained film owing to a less amount of the metals remaining in the film. Further, the use of the titanium compound is more preferred because the germanium compound is expensive.

When using the titanium compound upon production of the polyester, the content of the titanium element in the polyester is usually in the range of not more than 50 ppm, preferably 1 to 20 ppm, and more preferably 2 to 10 ppm. When the content of the titanium element in the polyester is excessively large, the polyester tends to suffer from accelerated deterioration in the step of melt-extruding the polyester so that the resulting film tends to exhibit a strong yellowish color. On the other hand, when the content of the titanium element in the polyester is excessively small, the polymerization efficiency tends to be deteriorated, so that the cost tends to be increased, and the resulting film tends to hardly exhibit a sufficient strength. In addition, when using the titanium compound upon production of the polyester, for the purpose of suppressing deterioration thereof in the melt-extrusion step, a phosphorus compound is preferably used to reduce an activity of the titanium compound. As the phosphorus compound, orthophosphoric acid is preferably used in view of productivity and thermal stability of the obtained polyester. The content of the phosphorus element in the polyester is usually in the range of 1 to 300 ppm, preferably 3 to 200 ppm, and more preferably 5 to 100 ppm based on the amount of the polyester melt-extruded. When the content of the phosphorus compound in the polyester is excessively large, gelation of the polyester or inclusion of foreign matters therein tends to be caused. On the other hand, when the content of the phosphorus compound in the polyester is excessively small, it is not possible to sufficiently reduce an activity of the titanium compound, so that the resulting film tends to exhibit a yellowish color.

For the purpose of imparting easy-slipping properties to the resulting film, preventing occurrence of flaws on the film in the respective steps and improving anti-blocking properties of the film, the polyester layer may also comprise particles. When the particles are compounded in the film, the kinds of particles compounded in the film are not particularly limited as long as they are capable of imparting easy-slipping properties to the resulting film. Specific examples of the particles include inorganic particles such as particles of silica, calcium carbonate, magnesium carbonate, barium carbonate, calcium sulfate, calcium phosphate, magnesium phosphate, kaolin, aluminum oxide, zirconium oxide and titanium oxide; and organic particles such as particles of acrylic resins, styrene resins, urea resins, phenol resins, epoxy resins and benzoguanamine resins. Further, there may also be used deposited particles obtained by precipitating and finely dispersing a part of metal compounds such as a catalyst during the process for production of the polyester. Of these particles, in particular, from the standpoint of exhibiting good effects even when used in a small amount, silica particles and calcium carbonate particles are preferably used.

The average particle diameter of the particles incorporated into the film is usually in the range of not more than 10 μm, preferably 0.01 to 5 μm, and more preferably 0.01 to 3 μm. When the average particle diameter of the particles is more than 10 μm, there tends occur such a fear that the obtained film suffers from defects owing to deteriorated transparency.

Further, the content of the particles in the polyester layer may vary depending upon the average particle diameter of the particles, and is therefore not particularly limited. The content of the particles in the polyester layer of the film is usually in the range of not more than 5% by weight, preferably 0.0003 to 3% by weight, and more preferably 0.0005 to 1% by weight. When the content of the particles in the polyester layer of the film is more than 5% by weight, there tends to occur such a fear that the obtained film suffers from defects owing to falling off of the particles and deteriorated transparency, etc. When no particles or merely a less amount of the particles are used in the film, there tend to occur problems such as insufficient slipping properties of the resulting film, so that it is necessary to take any measures for enhancing the slipping properties, such as incorporation of particles into the adhesive layer, or the like.

The shape of the particles used in the film is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

The method of adding the particles to the polyester layer is not particularly limited, and any conventionally known methods can be suitably used for adding the particles to the polyester layer. For example, the particles may be added at any optional stages in the process for producing the polyester forming the respective layers. The particles are preferably added to the polyester after completion of the esterification reaction or transesterification reaction.

The polyester film used in the present invention may also comprise, in addition to the above particles, conventionally known additives such as an ultraviolet absorber, an antioxidant, an antistatic agent, a thermal stabilizer, a lubricant, a dye, a pigment, etc., if required.

The thickness of the polyester film used in the present invention is not particularly limited, and the film may have any thickness as long as any suitable film can be formed. The thickness of the film is usually in the range of 2 to 350 μm, preferably 5 to 200 μm and more preferably 8 to 75 μm.

A specific example of the process for production of the film is described below. However, the present invention is not particularly limited to the below-mentioned production process, and a conventionally known film-forming method may also be used in the present invention.

In general, the film may be produced by melting a resin, forming the molten resin into a sheet, and then subjecting the resulting sheet to drawing for the purpose of enhancing strength thereof, etc.

For example, in the case of producing a biaxially oriented polyester film, there may be used the following method.

First, a raw polyester material is melted and extruded from a die using an extruder in the form of a molten sheet, and the molten sheet is cooled and solidified on a chilled roll to obtain an undrawn sheet. In this case, in order to enhance flatness of the obtained sheet, it is preferred to enhance adhesion between the sheet and the rotary chilled drum. For this purpose, an electrostatic pinning method or a liquid coating adhesion method is preferably used.

Next, the thus obtained undrawn sheet is drawn in one direction thereof using a roll-type or tenter-type drawing machine. The drawing temperature is usually 70 to 120° C. and preferably 80 to 110° C., and the draw ratio is usually 2.5 to 7 times and preferably 3.0 to 6 times.

Then, the thus drawn sheet is further drawn in the direction perpendicular to the direction of drawing in the first-stage drawing step. In this case, the drawing temperature is usually 70 to 170° C., and the draw ratio is usually 2.5 to 7 times and preferably 3.0 to 6 times.

Subsequently, the resulting biaxially drawn sheet is subjected to heat-setting treatment at a temperature of 180 to 270° C. under tension or under relaxation within 30% to obtain a biaxially oriented film.

Upon the above drawing steps, there may also be used the method in which the drawing in each direction is carried out in two or more stages. In such a case, the multi-stage drawing is preferably performed such that the total draw ratio in each of the two directions finally falls within the above-specified range.

Also, upon producing the polyester film constituting the adhesive film, there may also be used a simultaneous biaxial drawing method. The simultaneous biaxial drawing method is such a method in which the aforementioned undrawn sheet is drawn and oriented in both of the machine and width directions at the same time while maintaining the sheet in a suitably temperature-controlled condition in which the sheet is controlled to a temperature of usually 70 to 120° C. and preferably 80 to 110° C. The draw ratio used in the simultaneous biaxial drawing method is usually 4 to 50 times, preferably 7 to 35 times and more preferably 10 to 25 times in terms of an area ratio of the sheet to be drawn. Successively, the obtained biaxially drawn sheet is subjected to heat-setting treatment at a temperature of usually 180 to 270° C. under tension or under relaxation within 30% to obtain a drawn oriented film. As the apparatus used in the above simultaneous biaxial drawing method, there may be employed any conventionally known drawing apparatuses such as a screw type drawing apparatus, a pantograph type drawing apparatus and a linear drive type drawing apparatus, etc.

Next, the method of forming the adhesive layer constituting the adhesive film is described. As the method of forming the adhesive layer, there may be mentioned, for example, a coating method, a transfer method, a lamination method, etc. In view of facilitated formation of the adhesive layer, of these methods, preferred is the coating method.

As the coating method, the adhesive layer may be formed by either an in-line coating method in which the coating is carried out during the step of producing the film, or an off-line coating method in which the film produced is once taken outside of the film production system and subjected to the coating treatment. Of these coating methods, preferred is the in-line coating method.

More specifically, in the in-line coating method, the coating step is carried out in an optional stage during the period from the step of melt-extruding the resin for forming the film up to the step of taking-up the resulting film via the step of subjecting the melt-extruded resin to drawing and then heat-setting. In the in-line coating method, any of the undrawn sheet obtained by the melting and rapid cooling, the monoaxially drawn film, the biaxially oriented film before the heat-setting, and the film after the heat-setting but before the taking-up, is usually subjected to the coating step. For example, in the case of a sequential biaxial drawing process, there may be used such an excellent method in which after subjecting the monoaxially drawn film that is drawn in a length direction (longitudinal direction) of the film to the coating step, the thus coated monoaxially drawn film is drawn in a lateral direction thereof, though the present invention is not particularly limited thereto. The aforementioned in-line coating method is also advantageous from the standpoint of production cost, because the film is formed simultaneously with formation of the adhesive layer thereon. Also, since the drawing is conducted after the coating step, the thickness of the adhesive layer may be changed by adjusting a draw ratio of the film, so that the thin-film coating step can be more easily conducted as compared to the off-line coating method.

In addition, in the aforementioned in-line coating method, by providing the adhesive layer on the film before the drawing step, it is possible to subject the adhesive layer together with the base film to the drawing step, so that the adhesive layer can be strongly adhered to the base film. Further, upon production of the biaxially oriented polyester film, since the film is drawn while grasping end portions of the film by clips, etc., it is possible to constrain the film in both of the longitudinal and lateral directions. As a result, in the heat-setting step, it is possible to expose the film to high temperature without formation of wrinkles, etc., while maintaining flatness of the film.

For this reason, in the aforementioned in-line coating method, the heat-setting treatment after the coating step can be conducted at a high temperature that is not achievable by the other methods, so that it is possible to enhance film-forming properties of the adhesive layer, strongly adhere the adhesive layer to the base film, and further strengthen the resulting adhesive layer. In particular, the aforementioned method is very effective in the reaction using a crosslinking agent.

According to the process conducted by the aforementioned in-line coating method, no large change in dimension of the film is caused depending on whether or not the adhesive layer is formed thereon, and no large risk of formation of flaws or deposition of foreign matters on the film is also caused depending on whether or not the adhesive layer is formed thereon. Therefore, the in-line coating method is considerably advantageous as compared to the off-line coating method in which it is necessary to conduct the coating step as an additional surplus step. Furthermore, as a result of various studies, it has been found that the in-line coating method is also advantageous in such a point that the in-line coating method is capable of more effectively reducing adhesive residue as components of the adhesive layer transferred to an adherend when allowing the film of the present invention to adhere to the adherend. This is because the in-line coating method is capable of conducting the heat-setting treatment at a much higher temperature that is not achievable by the off-line coating method. It is considered that the aforementioned advantage of the in-line coating method is the result obtained from the stronger adhesion between the adhesive layer and the base film as achieved in the adhesive film of the present invention.

In the present invention, it is essentially required that the adhesive film comprises an adhesive layer comprising a resin having a glass transition point of not higher than 0° C., and an antistatic agent, in which a thickness of the adhesive layer is not more than 10 μm.

It has been found that when using the resin having a glass transition point of not higher than 0° C., it is possible to impart adequate adhesion properties to the polyester film. As the resin having a glass transition point of not higher than 0° C., there may be used conventionally known resins. Specific examples of the resin include a polyester resin, an acrylic resin, a urethane resin, a polyvinyl resin (such as polyvinyl alcohol and vinyl chloride-vinyl acetate copolymers), etc. Of these resins, in particular, in view of good adhesion properties and coatability, preferred are a polyester resin, an acrylic resin and a urethane resin. Also, in view of higher adhesion properties and good reusability of the resulting film, more preferred are a polyester resin and an acrylic resin. In addition, in view of good adhesiveness to the polyester film as the base material as well as good lamination properties to a polyester-based material, most preferred is a polyester resin, whereas in view of still higher adhesion properties, good lamination properties to an acrylic material, reduction in amount of adhesive components transferred to an adherend (adhesive residue) and anti-blocking properties against a back side of the film, most preferred is an acrylic resin.

The polyester resin may be those polyester resins produced, for example, from the following polycarboxylic acid and polyhydroxy compound as main constituents thereof. More specifically, as the polycarboxylic acid, there may be used terephthalic acid, isophthalic acid, orthophthalic acid, phthalic acid, 4,4'-diphenyldicarboxylic acid, 2,5-naphthalenedicarboxylic acid, 1,5-naphthalenedicarboxylic acid, 2,6-naphthalenedicarboxylic acid, 2,7-naphthalenedicarboxylic acid, 1,4-cyclohexanedicarboxylic acid, 2-potassium sulfo-terephthalic acid, 5-sodium sulfo-isophthalic acid, adipic acid, azelaic acid, sebacic acid, dodecanedicarboxylic acid, glutaric acid, succinic acid, trimellitic acid, trimesic acid, pyromellitic acid, trimellitic anhydride, phthalic anhydride, p-hydroxybenzoic acid, a trimellitic acid monopotassium salt and ester-forming derivatives thereof. Examples of the polyhydroxy compound include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexane dimethanol, p-xylylene glycol, an adduct of bisphenol A with ethylene glycol, diethylene glycol, triethylene glycol, polyethylene glycol, polypropylene glycol, polytetramethylene glycol, polytetramethyleneoxide glycol, dimethylol propionic acid, glycerin, trimethylol propane, sodium dimethylol ethyl sulfonate and potassium dimethylol propionate. The polyester resin may be synthesized by appropriately selecting one or more compounds from the aforementioned respective kinds of compounds and subjecting these compounds to polycondensation reaction by an ordinary method.

Among the aforementioned polyester resins, in order to reduce a glass transition point thereof to not higher than 0° C., the polyester resins comprising an aliphatic polycarboxylic acid or an aliphatic polyhydroxy compound as a constituent thereof are preferably used. In general, the polyester resin is constituted of an aromatic polycarboxylic acid and a polyhydroxy compound including an aliphatic polyhydroxy compound. Therefore, in order to reduce a glass transition point of the polyester resin to the level lower than that of ordinary polyester resins, it is effective to incorporate an aliphatic polycarboxylic acid into the polyester resin as a constituent thereof. From the standpoint of reducing a glass transition point of the polyester resin, among the aliphatic polycarboxylic acids, those aliphatic polycarboxylic acids having a large number of carbon atoms are suitably used, and the number of carbon atoms in the aliphatic polycarboxylic acids is usually in the range of not less than 6 (adipic acid), preferably not less than 8, and more preferably not less than 10. The upper limit of the number of carbon atoms in the aliphatic polycarboxylic acids is usually 20.

Also, from the standpoint of improving adhesion properties of the resulting film, the content of the aliphatic polycarboxylic acid in an acid component of the polyester resin is usually not less than 2 mol %, preferably not less than 4 mol %, more preferably not less than 6 mol %, and even more preferably not less than 10 mol %, and the upper limit of the content of the aliphatic polycarboxylic acid in an acid component of the polyester resin is usually 50 mol %.

In order to reduce a glass transition point of the polyester resin, the number of carbon atoms in the aliphatic polyhydroxy compound is preferably not less than 4 (butanediol). The content of the aliphatic polyhydroxy compound in a hydroxy component of the polyester resin is usually in the range of not less than 10 mol %, and preferably not less than 30 mol %.

In view of good adaptability to an in-line coating method, it is preferred that the polyester resin is rendered aqueous. For this reason, the polyester resin preferably comprises a sulfonic acid, a sulfonic acid metal salt, a carboxylic acid or a carboxylic acid metal salt as a constitutional unit thereof. In particular, among these compounds, from the standpoint of good dispersibility in water, preferred are sulfonic acid and a sulfonic acid metal salt, and more preferred is a sulfonic acid metal salt group.

In the case where sulfonic acid, a sulfonic acid metal salt, a carboxylic acid or a carboxylic acid metal salt is used as a constitutional unit of the polyester resin, the content of the sulfonic acid, the sulfonic acid metal salt, the carboxylic acid or the carboxylic acid metal salt in an acid component constituting the polyester resin is usually in the range of 0.1 to 10 mol % and preferably 0.2 to 8 mol %. When using the sulfonic acid, the sulfonic acid metal salt, the carboxylic acid or the carboxylic acid metal salt as a constitutional unit of the polyester resin in such an amount as to fall within the above-specified range, the obtained polyester resin can exhibit good dispersibility in water.

Also, in view of good appearance of the coating layer when formed by an in-line coating method, good adhesion properties and anti-blocking properties against the polyester film, and reduction in adhesive residue on an adherend when used as a surface protective film, the polyester resin preferably comprises a certain amount of an aromatic polycarboxylic acid as an acid component thereof. The content of the aromatic polycarboxylic acid in an acid component of the polyester resin is usually in the range of not less than 30 mol %, preferably not less than 50 mol % and more preferably not less than 60 mol %, and the upper limit of the content of the aromatic polycarboxylic acid in an acid component of the polyester resin is usually 98 mol %. In addition, among the aromatic polycarboxylic acids, from the standpoint of good adhesion properties of the resulting film, the aromatic polycarboxylic acids having a benzene ring structure such as terephthalic acid and isophthalic acid are more preferably used than those having a naphthalene ring structure. Furthermore, in order to further improve adhesion properties of the resulting film, it is more preferred that two or more kinds of aromatic polycarboxylic acids are used in combination with each other in the acid component of the polyester resin.

In order to improve adhesion properties of the resulting film, it is essentially required that the glass transition point of the polyester resin is not higher than 0° C. The glass transition point of the polyester resin is preferably not higher than −10° C., and more preferably not higher than −20° C. The lower limit of the glass transition point of the polyester resin is usually −60° C. When controlling the glass transition point of the polyester resin used herein to the above-specified range, it is possible to readily produce a film having optimum adhesion properties.

The acrylic resin used in the present invention is in the form of a polymer obtained from a polymerizable monomer including an acrylic monomer and a methacrylic monomer ("acrylic" and "methacrylic" are hereinafter also totally referred to merely as "(meth)acrylic"). The polymer as the acrylic resin may be either a homopolymer or a copolymer, or may also be a copolymer with a polymerizable monomer other than the acrylic or methacrylic monomer.

The polymer may also include a copolymer of any of the aforementioned polymers with the other polymer (such as, for example, a polyester and a polyurethane). Examples of such a copolymer include a block copolymer and a graft copolymer. In addition, the polymer may also include a polymer obtained by polymerizing the polymerizable monomer in a polyester solution or a polyester dispersion (which may also be in the form of a mixture of the polymers). Furthermore, the polymer may also include a polymer obtained by polymerizing the polymerizable monomer in a polyurethane solution or a polyurethane dispersion (which may also be in the form of a mixture of the polymers). Similarly, the polymer may also include a polymer obtained by polymerizing the polymerizable monomer in the other polymer solution or the other polymer dispersion (which may also be in the form of a mixture of the polymers). However, in view of good adhesion properties and less adhesive residue on an adherend, it is preferred that the acrylic resin contains no other polymer such as polyesters and polyurethanes (i.e., the acrylic resin is a (meth)acrylic resin constituted of the polymerizable monomer having a carbon-carbon double bond solely (which may be in the form of either a homopolymer or a copolymer)).

The above polymerizable monomer is not particularly limited. Examples of the typical compounds of the polymerizable monomer include various carboxyl group-containing monomers such as acrylic acid, methacrylic acid, crotonic acid, itaconic acid, fumaric acid, maleic acid and citraconic acid, and salts thereof; various hydroxyl group-containing monomers such as 2-hydroxyethyl (meth)acrylate, 2-hydroxypropyl (meth)acrylate, 4-hydroxybutyl (meth)acrylate, monobutylhydroxyl fumarate and monobutylhydroxyl itaconate; various (meth)acrylic acid esters such as methyl (meth)acrylate, ethyl (meth)acrylate, propyl (meth)acrylate, butyl (meth)acrylate, 2-ethylhexyl (meth) acrylate and lauryl (meth)acrylate; various nitrogen-containing compounds such as (meth)acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl propionate and vinyl acetate; various silicon-containing polymerizable monomers such as γ-methacryloxypropyl trimethoxysilane and vinyl trimethoxysilane; various phosphorus-containing vinyl-based monomers; various vinyl halide-based monomers such as vinyl chloride and vinylidene chloride; and various conjugated dienes such as butadiene.

In order to reduce a glass transition point of the resin to a temperature of not higher than 0° C., it is necessary to use a (meth)acrylic compound whose homopolymer has a glass transition point of not higher than 0° C. Examples of the (meth)acrylic compound whose homopolymer has a glass transition point of not higher than 0° C. include ethyl acrylate (glass transition point (glass transition point of a homopolymer thereof; hereinafter defined in the same way): −22° C.), n-propyl acrylate (glass transition point: −37° C.), isopropyl acrylate (glass transition point: −5° C.), n-butyl acrylate (glass transition point: −55° C.), n-hexyl acrylate (glass transition point: −57° C.), 2-ethylhexyl acrylate (glass transition point: −70° C.), n-octyl acrylate (glass transition point: −65° C.), isooctyl acrylate (glass transition point: −83° C.), n-nonyl acrylate (glass transition point: −63° C.), n-nonyl methacrylate (glass transition point: −35° C.), isononyl acrylate (glass transition point: −82° C.), n-decyl acrylate (glass transition point: −70° C.), n-decyl methacrylate (glass transition point: −45° C.), isodecyl acrylate (glass transition point: −55° C.), isodecyl methacrylate (glass transition point: −41° C.), lauryl acrylate (glass transition point: −30° C.), lauryl methacrylate (glass transition point: −65° C.), tridecyl acrylate (glass transition point: −75° C.), tridecyl methacrylate (glass transition point: −46° C.), isomyristyl acrylate (glass transition point: −56° C.), 2-hydroxyethyl acrylate (glass transition point: −15° C.), etc.

Among the aforementioned (meth)acrylic compounds, for the purpose of improving adhesion properties of the resulting film, alkyl (meth)acrylates comprising an alkyl group usually having not less than 4 carbon atoms, preferably 4 to 30 carbon atoms, more preferably 4 to 20 carbon atoms and even more preferably 4 to 14 carbon atoms are suitably used. From the standpoint of high industrial mass productivity as well as good handling properties and good supply stability, (meth)acrylic resins comprising n-butyl acrylate or 2-ethylhexyl acrylate as a constituent thereof are optimum.

The content of a (meth)acrylate unit comprising an alkyl group having not less than 4 carbon atoms at an ester end thereof in the (meth)acrylic resin is usually in the range of not less than 20% by weight, preferably 35 to 99% by weight, more preferably 50 to 98% by weight, even more preferably 65 to 95% by weight and most preferably 75 to 90% by weight. When the content of the (meth)acrylate unit comprising an alkyl group having not less than 4 carbon atoms at an ester end thereof in the (meth)acrylic resin is increased, the adhesion properties of the resulting film become higher. On the contrary, when the content of the (meth)acrylate unit comprising an alkyl group having not less than 4 carbon atoms at an ester end thereof in the (meth)acrylic resin is excessively small, the resulting film tends to be insufficient in adhesion strength in some cases.

The content of a (meth)acrylate unit comprising an alkyl group having less than 4 carbon atoms at an ester end thereof whose homopolymer has a glass transition point of not higher than 0° C., in the (meth)acrylic resin is usually in the range of not more than 50% by weight, preferably not more than 40% by weight and more not more than 30% by weight. When controlling the content of the (meth)acrylate unit comprising an alkyl group having less than 4 carbon atoms at an ester end thereof in the (meth)acrylic resin to the aforementioned range, the resulting film can exhibit good adhesion properties.

Also, from the standpoint of reducing transfer of the adhesive component to an adherend, among the aforementioned compounds, preferred are the compounds in which carbon atoms contained in an ester end is not more than than 2 or the compounds having a ring structure, and more preferred are the compounds in which carbon atoms contained in an ester end is 1 or aromatic compounds. Specific examples of the preferred compounds include methyl methacrylate, acrylonitrile, styrene and cyclohexyl acrylate.

The compound unit content of compounds in which carbon atoms contained in an ester end is not more than 2 in the (meth)acrylic resin is usually in the range of not more than 50% by weight, preferably 1 to 40% by weight, more preferably 3 to 30% by weight and even more preferably 5 to 20% by weight. When the content of the compound unit comprising an alkyl group having not more than than 2 carbon atoms at an ester end thereof in the (meth)acrylic resin is reduced, adhesion properties in an adequate range can be imparted to the resulting film without considerable deterioration in adhesion properties thereof. On the contrary, when the content of the compound unit comprising an alkyl group having not more than than 2 carbon atoms at an ester end thereof in the (meth)acrylic resin is increased, it is possible to reduce transfer of the adhesive component to an adherend. For these reasons, when the content of the compound unit comprising an alkyl group having not more than than 2 carbon atoms at an ester end thereof in the (meth) acrylic resin falls within the aforementioned range, the two objects including good adhesion properties of the film and reduced transfer of the adhesive components to an adherend are more likely to be achieved.

The content of the compound unit having a ring structure in the (meth)acrylic resin is usually in the range of not more than 50% by weight, preferably 1 to 45% by weight and more preferably 5 to 40% by weight. When the content of the compound unit having a ring structure in the (meth) acrylic resin is reduced, adhesion properties in an adequate range can be imparted to the resulting film without considerable deterioration in adhesion properties thereof. On the contrary, when the content of the compound unit having a ring structure in the (meth)acrylic resin is increased, it is possible to reduce transfer of the adhesive component to an adherend. For these reasons, when the content of the compound unit having a ring structure in the (meth)acrylic resin falls within the aforementioned range, the two objects including good adhesion properties of the film and reduced transfer of the adhesive components to an adherend are more likely to be achieved.

From the standpoint of attaining good adhesion properties of the resulting film, the content of the monomer whose homopolymer has a glass transition point of not higher than 0° C., as a monomer constituting the (meth)acrylic resin, is usually in the range of not less than 30% by weight, preferably not less than 45% by weight, more preferably not less than 60% by weight and even more preferably not less than 70% by weight based on a whole amount of the (meth)acrylic resin. On the other hand, the upper limit of the content of the aforementioned monomer in the (meth)acrylic resin is 99% by weight. When the content of the aforementioned monomer in the (meth)acrylic resin falls within the above-specified range, the resulting film is more likely to exhibit good adhesion properties.

Also, in order to improve adhesion properties of the resulting film, the glass transition point of the monomer whose homopolymer has a glass transition point of not higher than 0° C. is usually not higher than −20° C., preferably not higher than −30° C., more preferably not higher than −40° C., and even more preferably not higher than −50° C. The lower limit of the glass transition point of the monomer whose homopolymer has a glass transition point of not higher than 0° C. is −100° C. By controlling a glass transition point of the monomer whose homopolymer has a glass transition point of not higher than 0° C. to the above-specified range, it is possible to readily produce a film having adequate adhesion properties.

The more optimum configuration of the (meth)acrylic resin for improving adhesion properties of the resulting film is as follows. That is, the total content of n-butyl acrylate and 2-ethylhexyl acrylate in the (meth)acrylic resin is usually in the range of not less than 30% by weight, preferably not less than 40% by weight, more preferably not less than 50% by weight, even more preferably not less than 60% by weight and most preferably not less than 70% by weight. The upper limit of the total content of n-butyl acrylate and 2-ethylhexyl acrylate in the (meth)acrylic resin is usually 99% by weight. In particular, in the case where it is intended to eliminate transfer of the adhesive components to an adherend even when using a small amount of the crosslinking agent, the content of 2-ethylhexyl acrylate in the (meth)acrylic resin is usually in the range of not more than 90% by weight and preferably not more than 80% by weight, though the content of 2-ethylhexyl acrylate in the (meth)acrylic resin may vary depending upon the composition of the (meth)acrylic resin used as well as the composition of the adhesive layer formed.

In addition, in view of applications to in-line coating methods, etc., various hydrophilic functional groups may be introduced to the (meth)acrylic resin in order to render the (meth)acrylic resin usable in an aqueous system. Examples of the preferred hydrophilic functional groups introduced into the (meth)acrylic resin include a carboxylic acid group, a carboxylic acid salt group, a sulfonic acid group, a sulfonic acid salt group and a hydroxyl group. Of these groups, from the standpoint of good water resistance of the resulting film, more preferred are a carboxylic acid group, a carboxylic acid salt group and a hydroxyl group.

In order to introduce a carboxylic acid into the (meth)acrylic resin, various carboxyl group-containing monomers may be copolymerized with the aforementioned polymerizable monomer. Examples of the carboxyl group-containing monomers include acrylic acid, methacrylic acid, crotonic acid, itaconic acid, fumaric acid, maleic acid and citraconic acid. Of these monomers, acrylic acid and methacrylic acid are preferred, since they can be effectively dispersed in water.

In order to introduce a hydroxyl group into the (meth)acrylic resin, various hydroxyl group-containing monomers may be copolymerized with the aforementioned polymerizable monomer. Examples of the hydroxyl group-containing monomers include 2-hydroxyethyl (meth)acrylate, 2-hydroxypropyl (meth)acrylate, 4-hydroxybutyl (meth)acrylate, monobutylhydroxyl fumarate and monobutylhydroxyl itaconate. Of these monomers, 2-hydroxyethyl (meth)acrylate and 4-hydroxybutyl (meth)acrylate are preferred in view of easiness of industrial handing.

Also, a copolymer of an amino group-containing monomer such as dimethylaminoethyl (meth)acrylate or a copolymer of an epoxy group-containing monomer such as glycidyl (meth)acrylate may be incorporated as a crosslinking reaction group into the (meth)acrylic resin. However, if the content of the crosslinking reaction group in the (meth)acrylic resin is excessively large, adhesion properties of the resulting film tend to be adversely affected. Therefore, it is necessary that the amount of the crosslinking reaction group introduced into the (meth)acrylic resin is controlled to an adequate range.

The content of the hydrophilic functional group-containing monomer in the (meth)acrylic resin is usually in the range of not more than 30% by weight, preferably 1 to 20% by weight, more preferably 2 to 15% by weight and even more preferably 3 to 10% by weight. When the content of the hydrophilic functional group-containing monomer in the (meth)acrylic resin lies within the aforementioned range, the resulting (meth)acrylic resin can be readily applied to an aqueous system.

In order to improve adhesion properties of the resulting film, it is essentially required that the glass transition point of the (meth)acrylic resin is not higher than 0° C. The glass transition point of the (meth)acrylic resin is preferably in the range of not higher than −10° C., more preferably not higher than −20° C. and even more preferably not higher than −30° C. The lower limit of the glass transition point of the (meth)acrylic resin is usually −80° C. By controlling the glass transition point of the (meth)acrylic resin to the above-specified range, it is possible to readily produce a film having optimum adhesion properties. In addition, in the case where it is necessary to reduce transfer of the adhesive component to an adherend, the glass transition point of the (meth)acrylic resin is controlled to the range of usually not lower than −70° C., preferably not lower than −60° C. and more preferably not lower than −50° C.

The urethane resin used in the present invention is a high-molecular compound having a urethane bond in a molecule thereof. The urethane resin is usually produced by the reaction between a polyol and an isocyanate. Examples of the polyol include polycarbonate polyols, polyether polyols, polyester polyols, polyolefin polyols and acrylic polyols. These compounds may be used alone or in combination of any two or more thereof.

The polycarbonate polyols may be obtained by subjecting a polyhydric alcohol and a carbonate compound to dealcoholization reaction. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexane dimethanol, 1,7-heptanediol, 1,8-octanediol, 1,9-nonanediol, 1,10-decanediol, neopentyl glycol, 3-methyl-1,5-pentanediol and 3,3-dimethylol heptane. Examples of the carbonate compound include dimethyl carbonate, diethyl carbonate, diphenyl carbonate and ethylene carbonate. Examples of the polycarbonate polyols obtained by the reaction between the above compounds include poly(1,6-hexylene) carbonate and poly(3-methyl-1,5-pentylene)carbonate.

From the standpoint of improving adhesion properties of the resulting film, among the above polycarbonate polyols, preferred are the polycarbonate polyols constituted of a diol component comprising a chain-like alkyl group usually having 4 to 30 carbon atoms, preferably 4 to 20 carbon atoms, and more preferably 6 to 12 carbon atoms. From the standpoint of high industrial mass-productivity as well as good handling properties and good supply stability, among the above preferred polycarbonate polyols, copolymerized polycarbonate polyols comprising 1,6-hexanediol or at least two diols selected from the group consisting of 1,4-butanediol, 1,5-pentanediol and 1,6-hexanediol are optimum.

Examples of the polyether polyols include polyethylene glycol, polypropylene glycol, polyethylene/propylene glycol, polytetramethylene ether glycol and polyhexamethylene ether glycol.

From the standpoint of improving adhesion properties of the resulting film, among the above polyether polyols, preferred are those polyether polyols comprising an aliphatic diol, in particular, a straight-chain aliphatic diol, which usually has 2 to 30 carbon atoms, preferably 3 to 20 carbon atoms and more preferably 4 to 12 carbon atoms, as a monomer forming the polyether.

Examples of the polyester polyols include those compounds produced by reacting a polycarboxylic acid or an acid anhydride thereof with a polyhydric alcohol, as well as those compounds comprising a derivative unit of a lactone compound such as polycaprolactone. Examples of the polycarboxylic acid include malonic acid, succinic acid, glutaric acid, adipic acid, pimelic acid, suberic acid, sebacic acid, fumaric acid, maleic acid, terephthalic acid and isophthalic acid. Examples of the polyhydric alcohol include ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyl dialkanol amines and lactonediol.

Among the above polyols, in view of good adhesion properties of the resulting film, the polycarbonate polyols and the polyester polyols are more suitably used, and the polycarbonate polyols are even more suitably used.

Examples of a polyisocyanate compound used for producing the urethane resin include aromatic diisocyanates such as tolylene diisocyanate, xylylene diisocyanate, methylene diphenyl diisocyanate, phenylene diisocyanate, naphthalene diisocyanate and tolidine diisocyanate; aromatic ring-containing aliphatic diisocyanates such as α,α,α',α'-tetramethyl xylylene diisocyanate; aliphatic diisocyanates such as methylene diisocyanate, propylene diisocyanate, lysine diisocyanate, trimethyl hexamethylene diisocyanate and hexamethylene diisocyanate; and alicyclic diisocyanates such as cyclohexane diisocyanate, methyl cyclohexane diisocyanate, isophorone diisocyanate, dicyclohexylmethane diisocyanate and isopropylidene dicyclohexyl diisocyanate. These polyisocyanate compounds may be used alone or in combination of any two or more thereof.

When the urethane resin is synthesized, there may be used a chain extender. The chain extender used upon the synthesis is not particularly limited, and any chain extender may be used as long as it has two or more active groups capable of reacting with an isocyanate group. In general, there may be mainly used such a chain extender having two hydroxyl groups or two amino groups.

Examples of the chain extender having two hydroxyl groups include glycols, e.g., aliphatic glycols such as ethylene glycol, propylene glycol and butanediol; aromatic glycols such as xylylene glycol and bishydroxyethoxybenzene; and ester glycols such as neopentyl glycol hydroxypivalate. Examples of the chain extender having two amino groups include aromatic diamines such as tolylenediamine, xylylenediamine and diphenylmethanediamine; aliphatic diamines such as ethylenediamine, propylenediamine, hexanediamine, 2,2-dimethyl-1,3-propanediamine, 2-methyl-1,5-pentanediamine, trimethyl hexanediamine, 2-butyl-2-ethyl-1,5-pentanediamine, 1,8-octanediamine, 1,9-nonanediamine and 1,10-decanediamine; and alicyclic diamines such as 1-amino-3-aminomethyl-3,5,5-trimethyl cyclohexane, dicyclohexylmethanediamine, isopropylidene cyclohexyl-4,4'-diamine, 1,4-diaminocyclohexane and 1,3-bisaminomethyl cyclohexane.

The urethane resin may be dispersed or dissolved in a solvent as a medium, and is preferably dispersed or dissolved in water as the medium. In order to disperse or dissolve the urethane resin in water, there may be used those urethane resins of a forcibly emulsifiable type which can be dispersed and dissolved using an emulsifier, or those urethane resins of a self-emulsifiable type or a water-soluble type which are obtained by introducing a hydrophilic group into urethane resins, etc. Among these urethane resins, in particular, self-emulsifiable type urethane resins which are ionomerized by introducing an ionic group into a structure of urethane resins are preferred because they are excellent in storage stability of the coating solution as well as water resistance and transparency of the resulting adhesive layer.

Examples of the ionic group to be introduced into the urethane resins include various groups such as a carboxyl group, a sulfonic acid group, a phosphoric acid group, a phosphonic acid group and a quaternary ammonium salt group. Among these ionic groups, preferred is a carboxyl group. As the method of introducing a carboxyl group into the urethane resin, there may be used various methods which may be carried out in respective stages of the polymerization reaction. For example, there may be used the method in which a carboxyl group-containing resin is used as a comonomer component upon synthesis of a prepolymer of the urethane resin, or the method in which a carboxyl group-containing component is used as one component of the polyol, the polyisocyanate, the chain extender and the like. In particular, among these methods, there is preferably used the method in which a carboxyl group-containing diol is used to introduce a desired amount of a carboxyl group into the urethane resin by suitably adjusting an amount of the diol component charged.

For example, the diol used in the polymerization for production of the urethane resin may be copolymerized with dimethylol propionic acid, dimethylol butanoic acid, bis-(2-hydroxyethyl)propionic acid, bis-(2-hydroxyethyl)butanoic acid, etc. In addition, the carboxyl group thus introduced into the urethane resin is preferably formed into a salt thereof by neutralizing the carboxyl group with ammonia, amines, alkali metals, inorganic alkalis, etc. Among these compounds used for neutralizing the carboxyl group, especially preferred are ammonia, trimethylamine and triethylamine. When using such a urethane resin, the carboxyl group thereof from which the neutralizing agent is removed in the drying step after the coating step may be used as a cross-linking reaction site which can be reacted with other cross-linking agents. As a result, the coating solution using the above-described urethane resin is excellent in stability even when preserved in the form of a solution before subjected to coating treatment, and further the adhesive layer obtained therefrom can be further improved in durability, solvent resistance, water resistance, anti-blocking properties, etc.

It is essentially required that the glass transition point of the urethane resin used for improving adhesion properties of the resulting film is not higher than 0° C. The glass transition point of the urethane resin is preferably in the range of not higher than −10° C., more preferably not higher than −20° C., and even more preferably not higher than −30° C. The lower limit of the glass transition point of the urethane resin is usually −80° C. By controlling the glass transition point of the urethane resin to the above-specified range, it is possible to readily produce a film having optimum adhesion properties.

The antistatic agent may be used to reduce a surface resistance on a surface of the film for the purpose of preventing deposition of dirt and dusts on the film during various processes. The antistatic agent used herein is not particularly limited, and although any conventional known antistatic agents may be used in the present invention, a polymer-type antistatic agent is preferably used because of good heat resistance and good wet-heat resistance thereof. Examples of the polymer-type antistatic agent include a conductive polymer, an ammonium group-containing compound, a sulfonic acid group-containing compound, a polyether compound, a betaine compound or the like. Of these antistatic agents, in particular, from the standpoint of reducing a surface resistance of the resulting film and enhancing an antistatic performance thereof, the conductive polymer is preferably used. Also, from the standpoint of less coloration of the resulting film, the ammonium group-containing compound and the sulfonic acid group-containing compound are preferably used.

As a result of further study and research conducted by the present inventors, it has been found that in the case of using the conductive polymer as the antistatic agent, if a polyester resin is used as the resin having a glass transition point of not higher than 0° C. in combination with the conductive polymer, the resulting film is more excellent in antistatic performance as well as capability of satisfying both antistatic performance and adhesion strength of the film, as compared to those using the other resin such as an acrylic resin and a urethane resin. On the other hand, it has been found that when using the antistatic agents other than the conductive polymer, the film using an acrylic resin among the other resins as the resin having a glass transition point of not higher than 0° C. is most excellent in capability of satisfying both adhesion strength and antistatic performance thereof.

Examples of the conductive polymer include polythiophene-based polymers, polyaniline-based polymers, polypyrrole-based polymers, polyacetylene-based polymers, etc. Among these conductive polymers, there may be suitably used, for example, polythiophene-based polymers such as polymers in which poly(3,4-ethylenedioxythiophene) is used in combination with polystyrene sulfonic acid. The conductive polymers are more suitably used as compared to the aforementioned other antistatic agents, because they have a low resistance value. However, on the other hand, it is necessary to take any measures such as reduction in amount of the conductive polymers used, if the conductive polymers are used in the applications in which coloration and increased costs should be avoided.

The ammonium group-containing compound means a compound comprising an ammonium group in a molecule thereof. Examples of the ammonium group-containing compound include various ammonium compounds such as an aliphatic amine, an alicyclic amine and an aromatic amine. Of these ammonium group-containing compounds, preferred are polymer-type ammonium group-containing compounds, and the ammonium group is preferably not present as a counter ion but incorporated into a main chain or side chain of the polymer. For example, as the ammonium group-containing compound, there may be mentioned and suitably used those ammonium group-containing high-molecular weight compounds derived from polymers obtained by polymerizing a monomer comprising an addition-polymerizable ammonium group or a precursor of the ammonium group such as an amine. The polymers may be in the form of a homopolymer produced by polymerizing the monomer comprising an addition-polymerizable ammonium group or a precursor of the ammonium group such as an amine solely or a copolymer produced by copolymerizing the monomer with the other monomer.

Among the ammonium group-containing compounds, pyrrolidinium ring-containing compounds are also preferably used from the standpoint of excellent antistatic properties and heat resistance/stability of the resulting film.

The two substituent groups bonded to a nitrogen atom of the pyrrolidinium ring-containing compounds are each independently an alkyl group or a phenyl group, etc. The alkyl group or phenyl group may be substituted with the following substituent group. Examples of the substituent group that can be bonded to the alkyl group or phenyl group include a hydroxyl group, an amide group, an ester group, an alkoxy group, a phenoxy group, a naphthoxy group, a thioalkoxy group, a thiophenoxy group, a cycloalkyl group, a trialkyl ammonium alkyl group, a cyano group, and a halogen atom. Also, the two substituent groups bonded to the nitrogen atom may be chemically bonded to each other. Examples of the substituent groups include $—(CH_2)_m—$ (m=integer of 2 to 5), $—CH(CH_3)CH(CH_3)—$, $—CH{=}CH—CH{=}CH—$, $—CH{=}CH—CH{=}N—$, $—CH{=}CH—N{=}C—$, $—CH_2OCH_2—$, $—(CH_2)_2O(CH_2)_2—$ and the like.

The pyrrolidinium ring-containing polymer may be produced by subjecting a diallylamine derivative to cyclic polymerization using a radical polymerization catalyst. The cyclic polymerization may be carried out in a solvent such as water or a polar solvent such as methanol, ethanol, isopropanol, formamide, dimethylformamide, dioxane and acetonitrile using a polymerization initiator such as hydrogen peroxide, benzoyl peroxide and tertiary butyl peroxide by known methods, though the present invention is not particularly limited thereto. Also, a compound having a carbon-carbon unsaturated bond that is polymerizable with the diallylamine derivative may be used as a comonomer component.

In addition, from the standpoint of excellent antistatic properties and wet heat resistance/stability of the resulting film, preferred are polymers having the structure represented by the following formula (1). The polymers as the ammonium group-containing compounds may be in the form of a homopolymer or a copolymer, as well as a copolymer obtained by copolymerizing the compounds with a plurality of the other components.

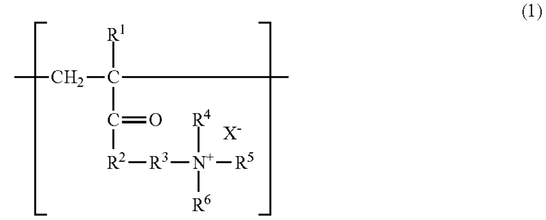

(1)

For example, in the above formula (1), the substituent group $R^1$ is a hydrogen atom or a hydrocarbon group such as an alkyl group having 1 to 20 carbon atoms and a phenyl group; $R^2$ is —O—, —NH— or —S—; $R^3$ is an alkylene group having 1 to 20 carbon atoms or the other structure capable of establishing the structure represented by the above formula (1); $R^4$, $R^5$ and $R^6$ are each independently a hydrogen atom, a hydrocarbon group such as an alkyl group having 1 to 20 carbon atoms and a phenyl group, or a hydrocarbon group to which a functional group such as a hydroxyalkyl group is added; and $X^-$ represents various counter ions.

Among them, in particular, from the standpoint of excellent antistatic properties and wet heat resistance/stability of the resulting film, in the above formula (1), the substituent $R^1$ is preferably a hydrogen atom or an alkyl group having 1 to 6 carbon atoms; $R^3$ is preferably an alkyl group having 1 to 6 carbon atoms; and $R^4$, $R^5$ and $R^6$ are preferably each independently a hydrogen atom or an alkyl group having 1 to 6 carbon atoms, and it is more preferred that any one of $R^4$, $R^5$ and $R^6$ is a hydrogen atom, and the other substituent groups are each an alkyl group having 1 to 4 carbon atoms.

Examples of an anion as a counter ion of the ammonium group of the aforementioned ammonium group-containing compound include various ions such as a halogen ion, a sulfonate ion, a phosphate ion, a nitrate ion, an alkyl sulfonate ion and a carboxylate ion.

Also, the number-average molecular weight of the ammonium group-containing compound is usually 1000 to 500000, preferably 2000 to 350000, and more preferably 5000 to 200000. When the number-average molecular weight of the ammonium group-containing compound is less than 1000, the resulting coating film tends to be insufficient in strength or tends to be deteriorated in heat resistance/stability. On the other hand, when the number-average molecular weight of the ammonium group-containing compound is more than 500000, the coating solution tends to have an excessively high viscosity, and therefore tends to be deteriorated in handling properties and coatability.

The sulfonic acid group-containing compound means a compound comprising sulfonic acid or a sulfonic acid salt in a molecule thereof. As the sulfonic acid group-containing compound, there may be suitably used, for example, compounds in which a large amount of sulfonic acid or a sulfonic acid salt is present, such as polystyrene sulfonic acid or derivative thereof.

The polystyrene sulfonic acid or derivative thereof preferably includes those compounds in which sulfonic acid groups or sulfonic acid salt groups are present in a para-position, form the standpoint of good antistatic properties of the resulting film. In addition, the polystyrene sulfonic acid or derivative thereof may be in the form of either a homopolymer or a copolymer comprising the other components. However, from the standpoint of good antistatic properties, the polystyrene sulfonic acid or derivative thereof are preferably in the form of a near homopolymer, and the content of the homopolymer in the polystyrene sulfonic acid or derivative thereof is usually in the range of not less than 80% by weight and preferably not less than 90% by weight.

The sulfonic acid group moiety in the polystyrene sulfonic acid or derivative thereof may be present in the state of either sulfonic acid or a sulfonic acid salt comprising a monovalent metal ion, an ammonium ion or the like. From the standpoint of attaining more excellent antistatic properties of the resulting film, it is more preferred that the sulfonic acid group moiety in the polystyrene sulfonic acid or derivative thereof is present in the state of sulfonic acid or a sulfonic acid monovalent metal salt (among these sulfonic acid monovalent metal salts, even more preferred are small metal ion-containing salts such as a lithium salt and a sodium salt). Furthermore, in the polystyrene sulfonic acid or derivative thereof, the amount of moieties that are present in the state of sulfonic acid is larger than the amount of moieties that are present in the state of a sulfonic acid salt. The amount of the sulfonic acid moieties in the polystyrene sulfonic acid or derivative thereof is usually in the range of not less than 60%, preferably not less than 70% and more preferably not less than 80% based on a total amount (total number) of the sulfonic acid moieties and the sulfonic acid salt moieties. From the standpoint of less coloration of the resulting film, it is preferred that the amount of the sulfonic acid salt moieties is increased (the amount of the sulfonic acid moieties is slightly reduced). In such a case, the amount of the sulfonic acid moieties in the polystyrene sulfonic acid or derivative thereof is usually in the range of not more than 99%, preferably not more than 97% and more preferably not more than 95%.

The molecular weight of the polystyrene sulfonic acid or derivative thereof in terms of a number-average molecular weight thereof is usually in the range of 5000 to 100000 and preferably 10000 to 50000. When the number-average molecular weight of the polystyrene sulfonic acid or derivative thereof is controlled to the aforementioned range, the resulting film is more likely to exhibit good antistatic performance and good coating suitability.

Examples of the polyether compound include polyethyleneoxide, polyetheresteramides, acrylic resins comprising polyethylene glycol on a side chain thereof, and the like.

In addition, in order to improve an appearance of the adhesive layer and reduce a surface resistance value of the resulting film, the polyol compound or polyether compound, for example, such as a polyalkyleneoxide, glycerin, polyglycerin and an alkyleneoxide adduct of glycerin or polyglycerin may be used in combination.

Examples of the preferred polyalkyleneoxide or derivative thereof include compounds having an ethyleneoxide structure or a propyleneoxide structure. When the chain length of an alkyl group in the alkyleneoxide structure is excessively long, the polyalkyleneoxide or derivative thereof tends to have higher hydrophobicity and therefore tends to be deteriorated in uniform dispersibility in a coating solution, so that the resulting film tends to be deteriorated in antistatic properties. Among the alkyleneoxide structures, especially preferred is the ethyleneoxide structure.

The polyglycerin is a compound prepared by polymerizing two or more glycerin molecules. The polymerization degree of the polyglycerin is usually in the range of 2 to 20. When using glycerin, the resulting film tends to be slightly deteriorated in transparency in some cases.

In addition, the alkyleneoxide adduct of glycerin or polyglycerin is a compound having such a structure that an alkyleneoxide or derivative thereof is added to a hydroxyl group of glycerin or polyglycerin.

In this case, the alkyleneoxides or derivatives thereof to be added to the respective hydroxyl groups of glycerin or polyglycerin may be different in their structures from each other. Furthermore, it is sufficient that the alkyleneoxide or derivative thereof is added to at least one hydroxyl group in a molecule of glycerin or polyglycerin, and it is therefore not necessary that the alkyleneoxide or derivative thereof is added to all hydroxyl groups in a molecule of glycerin or polyglycerin.

Moreover, the alkyleneoxide or derivative thereof to be added to glycerin or polyglycerin is preferably a compound having an ethyleneoxide structure or a propyleneoxide structure. When the chain length of an alkyl group in the alkyleneoxide structure is excessively long, the resulting alkyleneoxide adduct of glycerin or polyglycerin tends to have higher hydrophobicity and therefore tends to be deteriorated in uniform dispersibility in a coating solution, so that the resulting film tends to be deteriorated in antistatic properties. Among the alkyleneoxide structures, especially preferred is the ethyleneoxide structure. The number of the alkyleneoxides or derivatives thereof added to glycerin or polyglycerin is preferably controlled such that the weight-average molecular weight of the finally obtained compound is in the range of 300 to 2000.

Also, from the standpoint of high strength of the adhesive layer, a crosslinking agent is preferably used in combination. Under severe conditions, the adhesive component tends to be transferred to an adherend depending upon the kind of resin used. However, by using the crosslinking agent in combination, it becomes possible to improve transfer of the adhesive layer to an adherend.

As the crosslinking agent, there may be used conventionally known materials. Examples of the crosslinking agent include a melamine compound, an isocyanate-based compound, an epoxy compound, an oxazoline compound, a carbodiimide-based compound, a silane coupling compound, a hydrazide compound, an aziridine compound, etc. Among these crosslinking agents, preferred are a melamine compound, an isocyanate-based compound, an epoxy compound, an oxazoline compound, a carbodiimide-based compound and a silane coupling compound, and further from the standpoint of maintaining and well controlling adequate adhesion strength of the resulting film, more preferred are a melamine compound, an isocyanate-based compound and an epoxy compound. In particular, even more preferred are an isocyanate-based compound and an epoxy compound since these compounds are effective to suppress deterioration in adhesion strength of the resulting film when using them in combination with each other. Furthermore, in particular, from the standpoint of reducing transfer of the adhesive layer to the adherend, even more preferred are a melamine compound and an isocyanate-based compound, and further even more preferred is a melamine compound. In addition, from the standpoint of high strength of the adhesive layer, particularly preferred is a melamine compound. These crosslinking agents may be used singly or in combination of any two or more thereof.

According to construction of the adhesive layer or the kind of crosslinking agent, when the content of the crosslinking agent in the adhesive layer is excessively large, the resulting film tends to be deteriorated in adhesion properties. Therefore, in such a case, it is required to take care of a content of the crosslinking agent in the adhesive layer.

The melamine compound is a compound having a melamine skeleton therein. Examples of the melamine compound include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a dimer or higher polymer, or may be in the form of a mixture thereof. In view of good reactivity with various compounds, the melamine compound preferably comprises a hydroxyl group. In addition, there may also be used those compounds obtained by subjecting a urea or the like to co-condensation with a part of melamine. Further, a catalyst may also be used to enhance reactivity of the resulting melamine compound.

The isocyanate-based compound is a compound having an isocyanate derivative structure such as typically an isocyanate and a blocked isocyanate. Examples of the isocyanate include aromatic isocyanates such as tolylene diisocyanate, xylylene diisocyanate, methylene diphenyl diisocyanate, phenylene diisocyanate and naphthalene diisocyanate; aromatic ring-containing aliphatic isocyanates such as α,α,α', α'-tetramethyl xylylene diisocyanate; aliphatic isocyanates such as methylene diisocyanate, propylene diisocyanate, lysine diisocyanate, trimethyl hexamethylene diisocyanate and hexamethylene diisocyanate; and alicyclic isocyanates such as cyclohexane diisocyanate, methyl cyclohexane diisocyanate, isophorone diisocyanate, methylene-bis(4-cyclohexyl isocyanate) and isopropylidene dicyclohexyl diisocyanate. Further examples of the isocyanate include polymers and derivatives of these isocyanates such as biuret compounds, isocyanurate compounds, uretdione compounds and carbodiimide-modified compounds thereof. These isocyanates may be used alone or in combination of any two or more thereof. Of these isocyanates, in view of avoiding yellowing due to irradiation with ultraviolet rays, aliphatic isocyanates and alicyclic isocyanates are more suitably used as compared to aromatic isocyanates.

When the isocyanate-based compound is used in the form of a blocked isocyanate, examples of blocking agents used for production thereof include bisulfites; phenol-based compounds such as phenol, cresol and ethyl phenol; alcohol-based compounds such as propylene glycol monomethyl ether, ethylene glycol, benzyl alcohol, methanol and ethanol; active methylene-based compounds such as dimethyl malonate, diethyl malonate, methyl isobutanoyl acetate, methyl acetoacetate, ethyl acetoacetate and acetyl acetone; mercaptan-based compounds such as butyl mercaptan and dodecyl mercaptan; lactam-based compounds such as ε-caprolactam and δ-valerolactam; amine-based compounds such as diphenyl aniline, aniline and ethylene imine; acid amide compounds such as acetanilide and acetic acid amide; and oxime-based compounds such as formaldehyde, acetaldoxime, acetone oxime, methyl ethyl ketone oxime and cyclohexanone oxime. These blocking agents may be used alone or in combination of any two or more thereof. Among these the isocyanate-based compounds, in particular, from the standpoint of effectively reducing transfer of the adhesive layer to the adherend, preferred are those isocyanate compounds blocked with an active methylene-based compound.

In addition, the isocyanate-based compounds may be used in the form of a single substance or in the form of a mixture with various polymers or a combined product therewith. The isocyanate-based compounds are preferably used in the form of a mixture or a combined product with polyester resins or urethane resins from the standpoint of improving dispersibility or crosslinkability of the isocyanate-based compounds.

The epoxy compound is a compound having an epoxy group in a molecule thereof. Examples of the epoxy compound include condensation products of epichlorohydrin with a hydroxyl group of ethylene glycol, polyethylene glycol, glycerol, polyglycerol, bisphenol A, etc., or an amino group. Specific examples of the epoxy compound include polyepoxy compounds, diepoxy compounds, monoepoxy compounds and glycidyl amine compounds. Examples of the polyepoxy compounds include sorbitol polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether and trimethylolpropane polyglycidyl ether. Examples of the diepoxy compounds include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Examples of the monoepoxy compounds include allyl glycidyl ether, 2-ethylhexyl glycidyl ether and phenyl glycidyl ether. Examples of the glycidyl amine compounds include N,N,N',N'-tetraglycidyl-m-xylylenediamine and 1,3-bis(N,N-diglycidylamino)cyclohexane.

From the standpoint of good adhesion properties of the resulting adhesive layer, among the above epoxy compounds, preferred are polyether-based epoxy compounds. As to the number of epoxy groups in the epoxy compounds, tri- or higher-functional polyfunctional polyepoxy compounds are more preferably used than bifunctional epoxy compounds.

The oxazoline compound is a compound having an oxazoline group in a molecule thereof. In particular, the oxazoline compound is preferably in the form of a polymer having an oxazoline group which may be either a homopolymer of an addition-polymerizable oxazoline group-containing monomer or a copolymer of the addition-polymerizable oxazoline group-containing monomer with the other monomer(s). Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. These oxazoline compounds may be used alone or in the form of a mixture of any two or more thereof. Among these oxazoline compounds, 2-isopropenyl-2-oxazoline is more preferred because of good industrial availability thereof. The other monomers used in the copolymer are not particularly limited as long as they are monomers that are copolymerizable with the addition-polymerizable oxazoline group-containing monomer. Examples of the other monomers include (meth) acrylic acid esters such as alkyl (meth)acrylates (in which the alkyl group may be methyl, ethyl, n-propyl, isopropyl, n-butyl, isobutyl, t-butyl, 2-ethylhexyl, cyclohexyl or the like); unsaturated carboxylic acids such as acrylic acid, methacrylic acid, itaconic acid, maleic acid, fumaric acid, crotonic acid, styrenesulfonic acid and salts thereof (such as sodium salts, potassium salts, ammonium salts and tertiary amine salts); unsaturated nitriles such as acrylonitrile and methacrylonitrile; unsaturated amides such as (meth)acrylamide, N-alkyl (meth)acrylamides and N,N-dialkyl (meth) acrylamides (in which the alkyl group may be methyl, ethyl, n-propyl, isopropyl, n-butyl, isobutyl, t-butyl, 2-ethylhexyl, cyclohexyl or the like); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene. These other monomers may be used alone or in combination of any two or more thereof.

The amount of an oxazoline group present in the oxazoline compound is usually in the range of 0.5 to 10 mmol/g, preferably 1 to 9 mmol/g, more preferably 3 to 8 mmol/g, and even more preferably 4 to 6 mmol/g. When controlling the amount of an oxazoline group present in the oxazoline compound to the above-specified range, the resulting coating film can be improved in durability, and therefore it is possible to readily control adhesion properties of the resulting film.

The carbodiimide-based compound is in the form of a compound having one or more carbodiimide structures or carbodiimide derivative structures in a molecule thereof, and the preferred carbodiimide-based compound is a polycarbodiimide-based compound having two or more carbodiimide structures or carbodiimide derivative structures in a molecule thereof in view of attaining higher strength of the resulting adhesive layer or the like.

The carbodiimide-based compound may be synthesized by conventionally known techniques. In general, the carbodiimide-based compound may be obtained by a condensation reaction of a diisocyanate compound. The diisocyanate compound used in the reaction is not particularly limited, and may be either an aromatic diisocyanate or an aliphatic diisocyanate. Specific examples of the diisocyanate compound include tolylene diisocyanate, xylene diisocyanate, diphenylmethane diisocyanate, phenylene diisocyanate, naphthalene diisocyanate, hexamethylene diisocyanate, trimethyl hexamethylene diisocyanate, cyclohexane diisocyanate, methyl cyclohexane diisocyanate, isophorone diisocyanate, dicyclohexyl diisocyanate and dicyclohexylmethane diisocyanate.

Further, in order to improve water solubility or water dispersibility of the polycarbodiimide-based compound, a surfactant or a hydrophilic monomer such as a polyalkyleneoxide, a quaternary ammonium salt of a dialkylamino alcohol and a hydroxyalkyl sulfonic acid salt may be added thereto unless the addition thereof eliminates the effects of the present invention.

The silane coupling compound is in the form of an organosilicon compound comprising an organic functional group and a hydrolyzable group such as an alkoxy group in a molecule thereof. Examples of the silane coupling compound include epoxy group-containing compounds such as 3-glycidoxypropylmethyl dimethoxysilane, 3-glycidoxypropyl trimethoxysilane, 3-glycidoxypropylmethyl diethoxysilane, 3-glycidoxypropyl triethoxysilane and 2-(3,4-epoxycyclohexyl)ethyl trimethoxysilane; vinyl group-containing compounds such as vinyl trimethoxysilane and vinyl triethoxysilane; styryl group-containing compounds such as p-styryl trimethoxysilane and p-styryl triethoxysilane; (meth)acryl group-containing compounds such as 3-(meth) acryloxypropyl trimethoxysilane, 3-(meth)acryloxypropyl triethoxysilane, 3-(meth)acryloxypropylmethyl dimethoxysilane and 3-(meth)acryloxypropylmethyl diethoxysilane; amino group-containing compounds such as 3-aminopropyl trimethoxysilane, 3-aminopropyl triethoxysilane, N-2-(aminoethyl)-3-aminopropyl trimethoxysilane, N-2-(aminoethyl)-3-aminopropyl triethoxysilane, N-2-(aminoethyl)-3-aminopropylmethyl dimethoxysilane, N-2-(aminoethyl)-3-aminopropylmethyl diethoxysilane, 3-triethoxysilyl-N-(1,3-dimethylbutylidene)propyl amine, N-phenyl-3-aminopropyl trimethoxysilane and N-phenyl-3-aminopropyl triethoxysilane; isocyanurate group-containing compounds such as tris(trimethoxysylylpropyl)isocyanurate and tris(triethoxysylylpropyl)isocyanurate; and mercapto group-containing compounds such as 3-mercaptopropyl trimethoxysilane, 3-mercaptopropyl triethoxysilane, 3-mercaptopropylmethyl dimethoxysilane and 3-mercaptopropylmethyl diethoxysilane.

Among the aforementioned compounds, from the standpoint of keeping good strength and adhesion strength of the adhesive layer, more preferred are epoxy group-containing silane coupling compounds, double bond-containing silane coupling compounds having a double bond such as a vinyl group and a (meth)acryl group, and amino group-containing silane coupling compounds.

Meanwhile, these crosslinking agents are designed and used for improving performance of the adhesive layer by allowing the crosslinking agents to react with the compounds contained in the adhesive layer during a drying step or a film-forming step thereof. Therefore, it is estimated that the resulting adhesive layer comprises the unreacted cross-linking agent, compounds obtained after the reaction, or a mixture thereof.

In addition, from the standpoint of good appearance of the adhesive layer, well-controlled adhesion strength of the adhesive layer, increased strength of the adhesive layer, good adhesiveness to the base material film, good anti-blocking properties and prevention of transfer of the adhesive component to an adherend, a resin having a glass transition point of higher than 0° C. may also be used in combination with the aforementioned resin. As the resin having a glass transition point of higher than 0° C., there may be used conventionally known materials. Among the conventionally known materials, preferred are a polyester resin, an acrylic resin, a urethane resin and a polyvinyl resin (such as polyvinyl alcohol and a vinyl chloride/vinyl acetate copolymer, etc.), and in view of good influence on appearance and adhesion strength of the adhesive layer, more preferred is a resin selected from the group consisting of a polyester resin, an acrylic resin and a urethane resin. However, the aforementioned resin having a glass transition point of higher than 0° C. has such a fear of causing considerable deterioration in adhesion strength of the resulting film according to the method of using the resin. Therefore, care should be paid upon using such a resin.

Also, for the purpose of improving anti-blocking properties and slipping properties of the resulting film as well as well controlling adhesion properties thereof, particles may be used in combination with the aforementioned components for forming the adhesive layer. However, the inclusion of the particles in the adhesive layer tends to sometimes cause deterioration in adhesion strength of the resulting adhesive layer depending upon kinds of the particles used, and therefore care must be taken in such a case. In the case where no significant deterioration in adhesion strength of the resulting film is caused even upon using the particles in the adhesive layer, the average particle diameter of the particles used in the adhesive layer is usually not more than 3 times, preferably not more than 1.5 times, more preferably not more than 1.0 time, and even more preferably not more than 0.8 time a thickness of the adhesive layer. In particular, in the case where it is intended to directly exhibit an adhesion performance of the resin in the adhesive layer as such, it may be desirable in some cases to incorporate no particles into the adhesive layer.

On the surface of the adhesive film of the present invention which is opposed to the surface on which the adhesive layer is provided, there may be formed any functional layer for imparting various functions to the film. For example, in order to reduce occurrence of blocking of the film owing to the adhesive layer, a release layer is preferably provided on the opposite surface of the film. Also, in the preferred embodiment of the adhesive film of the present invention, in order to prevent defects owing to deposition of surrounding contaminants, etc., which are caused by peeling electrification or frictional electrification of the film, an antistatic layer may be provided on the opposite surface of the film. The functional layer may be provided by a coating method, and may be formed by either an in-line coating method or an off-line coating method. From the standpoint of low production cost as well as stabilization of releasing performance and antistatic performance of the resulting film when subjected to in-line heat treatment, among these methods, the in-line coating method is preferably used.

For example, in the case where the release functional layer is provided on the surface of the adhesive film opposed to the surface on which the adhesive layer is provided, a release agent used in the release functional layer is not particularly limited, and there may be used any conventionally known release agents. Examples of the release agent include a long-chain alkyl group-containing compound, a fluorine compound, a silicone compound, a wax, etc. Among these release agents, from the standpoint of less contamination and excellent capability for reducing occurrence of blocking, the long-chain alkyl group-containing compound and the fluorine compound are preferably used. In particular, in the case of attaching importance to reduction in occurrence of blocking, the silicone compound is preferably used. In addition, in order to improve decontamination properties on the surface of the film, the wax is effectively used. These release agents may be used alone or in combination of any two or more thereof.

The long-chain alkyl group-containing compound is a compound comprising a linear or branched alkyl group usually having not less than 6 carbon atoms, preferably not less than 8 carbon atoms, and more preferably not less than 12 carbon atoms. Examples of the alkyl group of the long-chain alkyl group-containing compound include a hexyl group, an octyl group, a decyl group, a lauryl group, an octadecyl group, a behenyl group, etc. Examples of the long-chain alkyl group-containing compound include various compounds such as a long-chain alkyl group-containing polymer compound, a long-chain alkyl group-containing amine compound, a long-chain alkyl group-containing ether compound, a long-chain alkyl group-containing quaternary ammonium salt, etc. In view of good heat resistance and decontamination properties, the polymer compound is preferred. Also, from the standpoint of effectively attaining good releasing properties, the polymer compound comprising a long-chain alkyl group on a side chain thereof is more preferred.

The polymer compound comprising a long-chain alkyl group on a side chain thereof may be produced by reacting a polymer comprising a reactive group with a compound comprising an alkyl group capable of reacting with the reactive group. Examples of the reactive group include a hydroxyl group, an amino group, a carboxyl group, an acid anhydride, etc.

Examples of the compound comprising the reactive group include polyvinyl alcohol, polyethylene imine, polyethylene amine, reactive group-containing polyester resins, reactive group-containing poly(meth)acrylic resins, etc. Of these compounds, in view of good releasing properties and easiness of handling, preferred is polyvinyl alcohol.

Examples of the compound comprising an alkyl group capable of reacting with the reactive group include long-chain alkyl group-containing isocyanates such as hexyl isocyanate, octyl isocyanate, decyl isocyanate, lauryl isocyanate, octadecyl isocyanate and behenyl isocyanate; long-chain alkyl group-containing organic chlorides such as hexyl chloride, octyl chloride, decyl chloride, lauryl chloride, octadecyl chloride and behenyl chloride; long-chain alkyl group-containing amines; long-chain alkyl group-containing alcohols; and the like. Of these compounds, in view of good releasing properties and easiness of handling, preferred are long-chain alkyl group-containing isocyanates, and more preferred is octadecyl isocyanate.

In addition, the polymer compound comprising a long-chain alkyl group on a side chain thereof may also be produced by polymerizing a long-chain alkyl (meth)acrylate or copolymerizing the long-chain alkyl (meth)acrylate with the other vinyl group-containing monomer. Examples of the long-chain alkyl (meth)acrylate include hexyl (meth)acrylate, octyl (meth)acrylate, decyl (meth)acrylate, lauryl (meth)acrylate, octadecyl (meth)acrylate, behenyl (meth) acrylate, etc.

The above fluorine compound is a compound comprising a fluorine atom therein. From the standpoint of a good coating appearance of the adhesive layer formed by the in-line coating method, among these fluorine compounds, organic fluorine compounds are preferably used. Examples of the organic fluorine compounds include perfluoroalkyl group-containing compounds, polymers of fluorine atom-containing olefin compounds, and aromatic fluorine compounds such as fluorobenzene. In view of good releasing properties of the resulting film, preferred are the perfluoroalkyl group-containing compounds. Further, as the fluorine compound, there may also be used the below-mentioned compounds including a long-chain alkyl compound.

Examples of the perfluoroalkyl group-containing compounds include perfluoroalkyl group-containing (meth)acrylates such as perfluoroalkyl (meth)acrylates, perfluoroalkyl methyl (meth)acrylates, 2-perfluoroalkyl ethyl (meth)acrylates, 3-perfluoroalkyl propyl (meth)acrylates, 3-perfluoroalkyl-1-methyl propyl (meth)acrylates and 3-perfluoroalkyl-2-propenyl (meth)acrylates, or polymers thereof; perfluoroalkyl group-containing vinyl ethers such as perfluoroalkyl methyl vinyl ethers, 2-perfluoroalkyl ethyl vinyl ethers, 3-perfluoropropyl vinyl ether, 3-perfluoroalkyl-1-methyl propyl vinyl ethers and 3-perfluoroalkyl-2-propenyl vinyl ethers, or polymers thereof; and the like. Of these perfluoroalkyl group-containing compounds, in view of good heat resistance and decontamination properties of the resulting film, preferred are the polymers. The polymers may be produced from either a single compound solely or a plurality of compounds. In addition, in view of good releasing properties of the resulting film, the perfluoroalkyl groups preferably have 3 to 11 carbon atoms. Further, the perfluoroalkyl group-containing compounds may also be in the form of a polymer of the perfluoroalkyl group-containing compounds with the below-mentioned compound comprising the long-chain alkyl compound. Furthermore, from the standpoint of good adhesion properties of the film to the base material thereof, the polymer with vinyl chloride is also preferred.

The above silicone compound is a compound having a silicone structure in a molecule thereof. Examples of the silicone compound include alkyl silicones such as dimethyl silicone and diethyl silicone, phenyl group-containing silicones such as phenyl silicone and methyl phenyl silicone, etc. As the silicone compound, there may also be used those silicone compounds comprising various functional groups. Examples of the functional groups include an ether group, a hydroxyl group, an amino group, an epoxy group, a carboxyl group, a halogen group such as a fluorine group, a perfluoroalkyl group, a hydrocarbon group such as various alkyl groups and various aromatic groups, and the like. Also, as the silicones comprising the other functional groups, there are generally known silicones comprising a vinyl group and hydrogen silicones comprising a silicon atom to which a hydrogen atom is directly bonded. Further, addition-type silicones obtained by using both kinds of the aforementioned silicones in combination (i.e., silicones of such a type as produced by addition reaction between the vinyl group and hydrogen silane) may also be used.

Furthermore, as the silicone compound, there may also be used modified silicones such as an acrylic-grafted silicone, a silicone-grafted acrylic compound, an amino-modified silicone and a perfluoroalkyl-modified silicone. In view of good heat resistance and decontamination properties of the resulting film, among these silicone compounds, preferred are curable-type silicone resins. As the curable-type silicone resins, there may be used any kinds of curing reaction-type silicones such as condensation type silicones, addition type silicones, active energy ray-curable type silicones, etc. Among the aforementioned silicone compounds, from the standpoint of reduced transfer of the compounds onto a rear side surface of the film when taking up the film into a roll, preferred is the condensation type silicone compound.

The preferred form of the silicone compound used in the present invention is a polyether group-containing silicone compound from the standpoint of reduced transfer of the compounds onto a rear side surface of the film, good dispersibility in an aqueous solvent and high adaptability to in-line coating. The polyether group of the polyether group-containing silicone compound may be bonded to a side chain or terminal end of the silicone compound, or may be bonded to a main chain of the silicone. From the standpoint of good dispersibility in an aqueous solvent, the polyether group is preferably bonded to a side chain or terminal end of the silicone compound.

The polyether group of the polyether group-containing silicone compound used in the present invention may have a conventionally known structure. From the standpoint of good dispersibility in an aqueous solvent, as the polyether group, an aliphatic polyether group is preferred as compared to an aromatic polyether group. Among the aliphatic polyether groups, more preferred are alkyl polyether groups. Also, from the standpoint of less problems upon synthesis owing to steric hindrance, straight-chain alkyl polyether groups are more preferred as compared to branched alkyl polyether groups. Among the straight-chain alkyl polyether groups, even more preferred are polyether groups comprising a straight-chain alkyl group having not more than 8 carbon atoms. In addition, when water is used as a developing solvent, in view of good dispersibility in water, a polyethylene glycol group or a polypropylene glycol group is preferred, and a polyethylene glycol group is particularly optimum.

The number of ether bonds in the polyether group is usually in the range of 1 to 30, preferably 2 to 20, and more preferably 3 to 15, from the standpoint of good dispersibility in an aqueous solvent and good durability of the resulting functional layer. When the number of ether bonds in the polyether group is excessively small, the polyether group-containing silicone compound tends to be deteriorated in dispersibility in the aqueous solvent. On the other hand, when the number of ether bonds in the polyether group is excessively large, the polyether group-containing silicone compound tends to cause deterioration in durability of the functional layer or releasing properties of the resulting film.

In the case where the polyether group of the polyether group-containing silicone compound is located at a side chain or a terminal end of the silicone, the terminal end of the polyether group is not particularly limited, and may include various functional groups such as a hydroxyl group, an amino group, a thiol group, a hydrocarbon group such as an alkyl group and a phenyl group, a carboxyl group, a sulfonic group, an aldehyde group, an acetal group, etc. Of these functional groups, in view of good dispersibility in water and good crosslinking properties for enhancing strength of the resulting functional layer, preferred are a hydroxyl group, an amino group, carboxyl group and a sulfonic group, and more preferred is a hydroxyl group.

The content of the polyether group in the polyether group-containing silicone compound in terms of a molar ratio thereof as calculated assuming that a molar amount of a siloxane bond in the silicone is 1, is usually in the range of 0.001 to 0.30%, preferably 0.01 to 0.20%, more preferably 0.03 to 0.15%, and even more preferably 0.05 to 0.12%. When adjusting the content of the polyether group to the above-specified range, it is possible to maintain good dispersibility of the compound in water as well as good durability and releasing properties of the resulting functional layer.

The molecular weight of the polyether group-containing silicone compound is preferably not so large in view of good dispersibility in an aqueous solvent, whereas the molecular weight of the polyether group-containing silicone compound is preferably large in view of good durability or releasing performance of the resulting functional layer. It has been demanded to achieve good balance between both of the aforementioned properties, i.e., between the dispersibility in an aqueous medium and the durability or releasing performance of the functional layer. The number-average molecular weight of the polyether group-containing silicone compound is usually in the range of 1000 to 100000, preferably 3000 to 30000, and more preferably 5000 to 10000.

In addition, in view of less deterioration in properties of the functional layer with time and good releasing performance thereof as well as anti-contamination properties in various respective steps, the content of low-molecular weight components (those having a number-average molecular weight of not more than 500) in the silicone compound is preferably as small as possible. The content of the low-molecular weight components in the silicone compound is usually in the range of not more than 15% by weight, preferably not more than 10% by weight, and more preferably not more than 5% by weight based on a whole amount of the silicone compound. When using the condensation type silicone, if the vinyl group bonded to silicon (vinyl silane) and the hydrogen group bonded to silicon (hydrogen silane) remain unreacted as such in the functional layer, the resulting functional layer tends to suffer from deterioration in various properties with time. Therefore, the content of the functional groups in the silicone compound is preferably not more than 0.1 mol %, and it is more preferred that the silicone compound comprises none of the functional groups.

Since it is difficult to apply the polyether group-containing silicone compound solely onto the film, the polyether group-containing silicone compound is preferably used in the form of a dispersion thereof in water. In order to disperse the polyether group-containing silicone compound in water, there may be used various conventionally known dispersants. Examples of the dispersants include an anionic dispersant, a nonionic dispersant, a cationic dispersant and an amphoteric dispersant. Of these dispersants, in view of good dispersibility of the polyether group-containing silicone compound and good compatibility thereof with a polymer other than the polyether group-containing silicone compound which is used for forming the functional layer, preferred are an anionic dispersant and a nonionic dispersant. As the dispersant, there may also be used a fluorine compound.

Examples of the anionic dispersant include sulfonic acid salt-based compounds and sulfuric acid ester salt-based compounds such as sodium dodecylbenzenesulfonate, sodium alkylsulfonates, sodium alkylnaphthalenesulfonates, sodium dialkylsulfosuccinates, sodium polyoxyethylene alkylethersulfates, sodium polyoxyethylene alkylallylethersulfates and polyoxyalkylene alkenylethersulfuric acid ammonium salts; carboxylic acid salt-based compounds such as sodium laurate and potassium oleate; and phosphoric acid salt-based compounds such as alkyl phosphoric acid salts, polyoxyethylene alkyl ether phosphoric acid salts and polyoxyethylene alkyl phenyl ether phosphoric acid salts. Of these anionic dispersants, from the standpoint of good dispersibility, preferred are sulfonic acid salts.

Examples of the nonionic dispersant include ether-type nonionic dispersants obtained by adding an alkyleneoxide such as ethyleneoxide and propyleneoxide to a hydroxyl group-containing compound such as a higher alcohol and an alkyl phenol, ester-type nonionic dispersants obtained by an ester bond between a polyhydric alcohol such as glycerol and sugars, and a fatty acid, ester-ether-type nonionic dispersants obtained by adding an alkyleneoxide to a fatty acid or a polyhydric alcohol fatty acid ester, amide-type nonionic dispersants comprising a hydrophobic group and a hydrophilic group bonded through an amide bond therebetween, etc. Of these nonionic dispersants, in view of good solubility in water and good stability, preferred are the ether-type nonionic dispersants, and in view of good handling properties in addition to the aforementioned properties, more preferred are the ether-type nonionic dispersants obtained by adding ethyleneoxide to the compound.

The amount of the dispersant used may vary depending upon the molecular weight and structure of the polyether group-containing silicone compound used as well as the kind of dispersant used, and therefore is not particularly limited. However, the amount of the dispersant is controlled, as a measure, such that the weight ratio thereof to the polyether group-containing silicone compound as calculated assuming that the amount of the polyether group-containing silicone compound is 1, is usually in the range of 0.01 to 0.5, preferably 0.05 to 0.4, and more preferably 0.1 to 0.3.

The above wax includes those waxes selected from natural waxes, synthetic waxes and mixtures of these waxes. Examples of the natural waxes include vegetable waxes, animal waxes, mineral waxes and petroleum waxes. Specific examples of the vegetable waxes include candelilla waxes, carnauba waxes, rice waxes, haze waxes and jojoba oils. Specific examples of the animal waxes include beeswaxes, lanolin and spermaceti waxes. Specific examples of the mineral waxes include montan waxes, ozokerite and ceresin. Specific examples of the petroleum waxes include paraffin waxes, microcrystalline waxes and petrolatum. Specific examples of the synthetic waxes include synthetic hydrocarbons, modified waxes, hydrogenated waxes, fatty acids, acid amides, amines, imides, esters and ketones. As the synthetic hydrocarbons, there may be mentioned, for example, Fischer-Tropsch waxes (alias: Sasol Wax), polyethylene waxes or the like. In addition, those polymers having a low molecular weight (specifically, those polymers having a number-average molecular weight of 500 to 20000) are also included in the synthetic hydrocarbons. Specific examples of the synthetic hydrocarbons include polypropylene, ethylene-acrylic acid copolymers, polyethylene glycol, polypropylene glycol, and blocked or grafted combined products of polyethylene glycol and polypropylene glycol. Specific examples of the modified waxes include montan wax derivatives, paraffin wax derivatives and microcrystalline wax derivatives. The derivatives as used herein mean compounds obtained by subjecting the respective waxes to any treatment selected from refining, oxidation, esterification and saponification, or combination of these treatments. Specific examples of the hydrogenated waxes include hardened castor oils and hardened castor oil derivatives.

Of these waxes, in view of well-stabilized properties thereof, preferred are the synthetic waxes, more preferred are polyethylene waxes, and even more preferred are polyethylene oxide waxes. The number-average molecular weight of the synthetic waxes is usually in the range of 500 to 30000, preferably 1000 to 15000, and more preferably 2000 to 8000, from the standpoint of good stability of properties such as anti-blocking properties and good handling properties.

In the case where the antistatic functional layer is provided on the surface of the adhesive film opposed to the surface on which the adhesive layer is formed, the antistatic agent incorporated in the antistatic functional layer is not particularly limited, and there may be used conventionally known antistatic agents. Among them, in view of good heat resistance and good wet heat resistance of the resulting film, preferred are polymer-type antistatic agents. More specifically, as the antistatic agent incorporated in the antistatic functional layer, there may be mentioned the same antistatic agent as used in the adhesive layer.

In the preferred embodiment of the adhesive film of the present invention, the functional layer provided on the surface of the adhesive film opposed to the surface on which the adhesive layer is formed may also comprise both of the aforementioned release agent and antistatic agent to impart a combined function of the antistatic performance and release performance to the film.

Upon forming the functional layer, in order to improve appearance or transparency of the resulting functional layer and well control slipping properties of the resulting film, it is possible to use various polymers such as polyester resins, acrylic resins and urethane resins as well as crosslinking agents used for forming the adhesive layer in combination with the aforementioned components. In particular, from the standpoint of strengthening the functional layer and reducing occurrence of blocking therein, it is preferred that any of a melamine compound, an oxazoline compound, an isocyanate-based compound, an epoxy compound and a carbodiimide-based compound is used in combination with the aforementioned components. Of these compounds, particularly preferred is the melamine compound.

Also, it is possible to incorporate particles into the functional layer for the purpose of improving anti-blocking properties and slipping properties of the resulting film unless the subject matter of the present invention is adversely influenced by addition of the particles. However, in the case where the functional layer has a release performance, the resulting film may exhibit sufficient anti-blocking properties and slipping properties in many cases. Therefore, it is preferred that the particles are not used in the functional layer having such a release performance in combination with the other components from the standpoint of good appearance thereof.

Further, upon forming the adhesive layer and the functional layer, it is also possible to use various additives such as a defoaming agent, a coatability improver, a thickening agent, an organic lubricant, an antistatic agent, an ultraviolet absorber, an antioxidant, a foaming agent, a dye and a pigment, etc., if required, in combination with the aforementioned components, unless the subject matter of the present invention is adversely affected by addition of these additives.

In the case where the antistatic agent used in combination with the resin having a glass transition point of not higher than 0° C. is the conductive polymer, the content of the resin in the adhesive layer constituting the adhesive film is usually in the range of 10 to 99.9% by weight, preferably 30 to 99.8% by weight, more preferably 50 to 98% by weight, even more preferably 65 to 97% by weight and most preferably 75 to 94% by weight. On the other hand, in the case where the antistatic agent used in combination with the resin having a glass transition point of not higher than 0° C. is the substance other than the conductive polymer, the content of the resin in the adhesive layer constituting the adhesive film is usually in the range of 10 to 90% by weight, preferably 30 to 85% by weight and more preferably 50 to 80% by weight. When the content of the resin in the adhesive layer is excessively small, the resulting film tends to be insufficient in adhesion properties. On the contrary, when the content of the resin in the adhesive layer is excessively large, the resulting film tends to be insufficient in antistatic performance owing to a less content of the antistatic agent in the adhesive layer, and therefore tends to suffer from problems concerning deposition of dirt and dusts thereon in some cases.

In the case where the antistatic agent used in the adhesive layer is the conductive polymer, the content of the antistatic agent in the adhesive layer constituting the adhesive film is usually in the range of 0.1 to 80% by weight, preferably 0.2 to 50% by weight, more preferably 0.5 to 30% by weight, even more preferably 1.0 to 20% by weight and most preferably 1.5 to 8% by weight. On the other hand, in the case where the antistatic agent used in the adhesive layer is the substance other than the conductive polymer, the content of the antistatic agent in the adhesive layer constituting the adhesive film is usually in the range of 5 to 90% by weight, preferably 10 to 70% by weight and more preferably 15 to 50% by weight. When the content of the antistatic agent in the adhesive layer is excessively small, the resulting film tends to be insufficient in antistatic performance, and therefore tends to suffer from problems concerning deposition of dirt and dusts thereon. On the contrary, when the content of the antistatic agent in the adhesive layer is excessively large, the resulting film tends to be insufficient in adhesion properties owing to a less content of the resin having a glass transition point of not higher than 0° C. in the adhesive layer in some cases.

In the adhesive film of the present invention, in the case where the functional layer having a release performance is provided on the surface of the adhesive film opposed to the surface on which the adhesive layer is formed, the content of the release agent in the functional layer is not particularly limited since an appropriate amount of the release agent to be used in the functional layer may vary depending upon the kind of release agent to be incorporated therein, and is usually in the range of not less than 3% by weight, preferably not less than 15% by weight, and more preferably 25 to 99% by weight. When the content of the release agent in the functional layer is less than 3% by weight, occurrence of blocking in the resulting film tends to be hardly reduced to a sufficient extent.

In the case where the long-chain alkyl compound or fluorine compound is used as the release agent, the content of the long-chain alkyl compound or fluorine compound in the functional layer is usually in the range of not less than 5% by weight, preferably 15 to 99% by weight, more preferably 20 to 95% by weight, and even more preferably 25 to 90% by weight. When using the long-chain alkyl compound or fluorine compound in the above-specified range, it is possible to effectively reduce occurrence of blocking in the resulting film. Also, the content of the crosslinking agent in the functional layer is usually in the range of not more than 95% by weight, preferably 1 to 80% by weight, more preferably 5 to 70% by weight, and even more preferably 10 to 50% by weight. As the crosslinking agent, there are preferably used a melamine compound and an isocyanate-based compound (among them, particularly preferred are blocked isocyanates obtained by blocking isocyanates with an active methylene-based compound), and more preferred is the melamine compound from the standpoint of reducing occurrence of blocking in the resulting film.

When using a condensation-type silicone compound as the release agent, the content of the condensation-type silicone compound in the functional layer is usually in the range of not less than 3% by weight, preferably 5 to 97% by weight, more preferably 8 to 95% by weight, and even more preferably 10 to 90% by weight. When using the condensation-type silicone compound in the above-specified range, it is possible to effectively reduce occurrence of blocking in the resulting film. Also, the content of the crosslinking agent in the functional layer is usually in the range of not more than 97% by weight, preferably 3 to 95% by weight, more preferably 5 to 92% by weight, and even more preferably 10 to 90% by weight. As the crosslinking agent, there is preferably used a melamine compound from the standpoint of reducing occurrence of blocking in the resulting film.

When using an addition-type silicone compound as the release agent, the content of the addition-type silicone compound in the functional layer is usually in the range of not less than 5% by weight, preferably not less than 25% by weight, more preferably not less than 50% by weight, and even more preferably not less than 70% by weight. The upper limit of the content of the addition-type silicone compound in the functional layer is usually 99% by weight and preferably 90% by weight. When using the addition-type silicone compound in the above-specified range, it is possible to effectively reduce occurrence of blocking in the resulting film, and attain a good appearance of the functional layer.

When using a wax as the release agent, the content of the wax in the functional layer is usually in the range of not less than 10% by weight, preferably 20 to 90% by weight, and more preferably 25 to 70% by weight. When using the wax in the above-specified range, it is possible to effectively reduce occurrence of blocking in the resulting film. However, in the case where the wax is used for the purpose of enhancing decontamination properties on the surface of the resulting film, it is possible to reduce the content of the wax in the functional layer. In such a case, the content of the wax in the functional layer is usually in the range of not less than 1% by weight, preferably 2 to 50% by weight, and more preferably 3 to 30% by weight. Also, the content of the crosslinking agent in the functional layer is usually in the range of not more than 90% by weight, preferably 10 to 70% by weight, and more preferably 20 to 50% by weight. As the crosslinking agent, there is preferably used a melamine compound from the standpoint of reducing occurrence of blocking in the resulting film.

On the other hand, in the case where the functional layer having an antistatic performance is provided on the surface of the adhesive film opposed to the surface on which the adhesive layer is formed, the content of the antistatic agent in the functional layer is not particularly limited since an appropriate amount of the antistatic agent used in the functional layer may vary depending upon the kind of antistatic agent to be incorporated therein, and is usually in the range of not less than 0.5% by weight, preferably 3 to 90% by weight, more preferably 5 to 70% by weight, and even more preferably 8 to 60% by weight. When the content of the antistatic agent in the functional layer is less than 0.5% by weight, the resulting adhesive film tends to be insufficient in antistatic effect as well as effect of preventing deposition of surrounding contaminants, etc., thereon.

In the case where an antistatic agent other than the conductive polymer is used as the above antistatic agent, the content of the antistatic agent other than the conductive polymer in the antistatic layer is usually in the range of not less than 5% by weight, preferably 10 to 90% by weight, more preferably 20 to 70% by weight, and even more preferably 25 to 60% by weight. When the content of the antistatic agent other than the conductive polymer in the antistatic layer is less than 5% by weight, the resulting film tends to be insufficient in antistatic effect as well as effect of preventing deposition of surrounding contaminants, etc., thereon.

In the case where the conductive polymer is used as the above antistatic agent, the content of the conductive polymer in the antistatic layer is usually in the range of not less than 0.5% by weight, preferably 3 to 70% by weight, more preferably 5 to 50% by weight, and even more preferably 8 to 30% by weight. When the content of the conductive polymer in the antistatic layer is less than 0.5% by weight, the resulting film tends to be insufficient in antistatic effect as well as effect of preventing deposition of surrounding contaminants, etc., thereon.

The analysis of the components in the adhesive layer or the functional layer may be conducted, for example, by analysis methods such as TOF-SIMS, ESCA, fluorescent X-ray analysis and IR.

Upon forming the adhesive layer or the functional layer, the adhesive film is preferably produced by the method in which a solution or a solvent dispersion comprising a series of the above-mentioned compounds is prepared as a coating solution having a concentration of usually about 0.1 to about 80% by weight in terms of a solid content thereof, and the thus prepared coating solution is applied onto a film. In particular, in the case where the adhesive layer or the functional layer is formed by an in-line coating method, the coating solution is preferably used in the form of an aqueous solution or a water dispersion. The coating solution may also comprise a small amount of an organic solvent for the purpose of improving dispersibility in water, film-forming properties or the like. In addition, the organic solvent may be used alone or may be appropriately used in combination of any two or more kinds thereof.

It is essentially required that the thickness of the adhesive layer is not more than 10 μm, preferably 1 nm to 4 μm, more preferably 10 nm to 1 μm, even more preferably 20 to 700 nm, further even more preferably 30 to 600 nm and still further even more preferably 50 to 480 nm. When the thickness of the adhesive layer is controlled to the aforementioned range, the resulting film can readily maintain adequate adhesion properties, antistatic properties and anti-blocking properties.

The adhesive layer generally has a thickness as large as more than 10 μm. In such a case, for example, when using the adhesive film for producing a polarizing plate in which the adhesive film is laminated onto an adherend such as a polarizing plate, a retardation plate or a viewing angle widening plate, and the resulting laminate is cut into an appropriate size, in some cases, there tends to remarkably occur squeeze-out of an adhesive included in the adhesive layer.

However, by controlling the thickness of the adhesive layer to the aforementioned range, it is possible to minimize an amount of the adhesive squeezed out. This advantageous effect becomes more remarkable as the thickness of the adhesive layer is reduced. In addition, as the thickness of the adhesive layer is reduced, an absolute amount of the adhesive layer present on the film becomes smaller. Therefore, the reduced thickness of the adhesive layer is effective to reduce an adhesive residue as the adhesive components of the adhesive layer transferred to the adherend. It has been further found that by controlling the thickness of the adhesive layer to the aforementioned specific range, it is possible to attain an adequate adhesion strength of the resulting film without causing excessive increase thereof. As a result, the resulting film can be readily subjected to lamination-release operations when used in the applications in which it is required to satisfy both of adhesion performance and release performance for releasing the film after being adhered, for example, when used in a process for production of a polarizing plate, etc., so that it is possible to obtain an optimum film usable in these applications.

As the thickness of the adhesive layer is reduced, the resulting film can be more effectively improved in anti-blocking properties. Therefore, the reduced thickness of the adhesive layer is preferred since when the adhesive layer is formed by an in-line coating method, production of the film can be facilitated. On the contrary, when the thickness of the adhesive layer is excessively small, the resulting film may exhibit no adhesion properties in some cases depending upon construction of the adhesive layer. For this reason, the thickness of the adhesive layer can be determined within the aforementioned preferred range according to the applications thereof.

The thickness of the functional layer may vary depending upon the functions to be imparted to the film, and therefore is not particularly limited. For example, the thickness of the functional layer for imparting a release performance or an antistatic performance to the film is usually in the range of 1 nm to 3 μm, preferably 10 nm to 1 μm, more preferably 20 to 500 nm, and even more preferably 20 to 200 nm. When the thickness of the functional layer used lies within the above-specified range, the resulting film can be readily improved in anti-blocking properties as well as antistatic performance, and can exhibit a good coating appearance.

As the method of forming the adhesive layer or the functional layer, there may be used conventionally known coating methods such as a gravure coating method, a reverse roll coating method, a die coating method, an air doctor coating method, a blade coating method, a rod coating method, a bar coating method, a curtain coating method, a knife coating method, a transfer roll coating method, a squeeze coating method, an impregnation coating method, a kiss coating method, a spray coating method, a calender coating method, an extrusion coating method, and the like.

The drying and curing conditions used upon forming the adhesive layer on the film are not particularly limited. When forming the adhesive layer by a coating method, the temperature upon drying the solvent used in the coating solution, such as water, is usually in the range of 70 to 150° C., preferably 80 to 130° C., and more preferably 90 to 120° C. The drying time is usually in the range of 3 to 200 sec and preferably 5 to 120 sec. In addition, in order to enhance strength of the adhesive layer, the film production process preferably comprises a heat-setting treatment step. The temperature of the heat-setting treatment step is usually in the range of 180 to 270° C., preferably 200 to 250° C. and more preferably 210 to 240° C. The time of the heat-setting treatment step is usually in the range of 3 to 200 sec and preferably 5 to 120 sec.

In addition, the heat-setting treatment may be used in combination with irradiation with active energy rays such as irradiation with ultraviolet rays, if required. The film constituting the adhesive film according to the present invention may be previously subjected to surface treatments such as corona treatment and plasma treatment.

The adhesion strength of the adhesive layer as measured in terms of an adhesion strength to a polymethyl methacrylate plate by the below-mentioned measuring method is usually in the range of 1 to 5000 mN/cm, preferably 3 to 3000 mN/cm, more preferably 5 to 500 mN/cm, even more preferably 7 to 300 mN/cm and most preferably 10 to 100 mN/cm. When the adhesion strength of the adhesive layer as measured by adhering to a polymethyl methacrylate plate is controlled to the aforementioned range, the resulting film can satisfy both of good adhesion performance and good release performance when releasing the film after lamination thereof, so that it is possible to obtain an optimum laminate suitably used in various industrial applications in which adhesion-release operations are conducted. In addition, it is more likely that the resulting film can exhibit good anti-blocking properties.

To evaluate the anti-blocking properties of the adhesive film, the adhesive layer side surface of the adhesive film is overlapped on the opposite side surface (the surface on the side of the functional layer, if any) thereof, and the thus overlapped film is pressed at 40° C. and 80% RH under 10 $kg/cm^2$ for 20 hr. The delamination load of the adhesive film after being pressed under the aforementioned conditions is usually in the range of not more than 100 g/cm, preferably not more than 30 g/cm, more preferably not more than 20 g/cm, even more preferably not more than 10 g/cm, and most preferably not more than 8 g/cm. When the delamination load of the adhesive film is controlled so as to fall within the aforementioned range, the risk of blocking of the film is more likely to hardly occur, so that it is possible to provide the film having a still higher practicability.

The surface resistance value of the adhesive layer as an index of an antistatic performance thereof is usually in the range of not more than $1\times10^{12}$ •, preferably not more than $1\times10^{11}$ • and more preferably not more than $5\times10^{10}$ •. When the surface resistance value of the adhesive layer lies within the aforementioned range, the resulting film hardly suffers from deposition of dirt and dusts thereon.

In addition, in the applications in which it is also required to impart antistatic properties to the functional layer side, the surface resistance value of the functional layer is usually in the range of not more than $1\times10^{12}$ •, preferably not more than $1\times10^{11}$ • and more preferably not more than $5\times10^{10}$ •. When the surface resistance value of the functional layer lies within the aforementioned range, the resulting film hardly suffers from deposition of dirt and dusts thereon.

In addition, the surface of the adhesive film which is opposed to the surface on which the adhesive layer is formed (i.e., the surface of the adhesive film on the side of the functional layer, if any) may be roughened as one of the methods of improving anti-blocking properties of the surface of the adhesive film against the adhesive layer side thereof. The roughness of the surface of the adhesive film on the side opposed to the adhesive layer may vary depending upon the kind or adhesion strength of the adhesive layer, and therefore is not particularly limited. However, irrespective of whether or not the functional layer is formed on the opposite surface of the film, in the case where it is intended to improve the anti-blocking properties of the film by controlling the surface roughness thereof, the arithmetic average roughness (Sa) of the surface of the adhesive film on the side opposed to the adhesive layer is usually in the range of not less than 5 nm, preferably not less than 8 nm, and more preferably not less than 30 nm. The upper limit of the arithmetic average roughness (Sa) of the surface of the adhesive film on the side opposed to the adhesive layer is not particularly limited. However, the upper limit of the arithmetic average roughness (Sa) of the surface of the adhesive film on the side opposed to the adhesive layer is 300 nm from the standpoint of good transparency of the resulting film. Meanwhile, in the case where the surface of the adhesive film opposed to the surface on which the adhesive layer is formed has good release properties by the method of forming a release functional layer thereon, etc., the good release properties of the surface of the adhesive film on the side opposed to the adhesive layer is predominant and therefore the Sa value thereof has merely a low influence on anti-blocking properties of the film, so that no particular attention to the Sa value needs to be paid. However, in the case where the surface of the adhesive film opposed to the surface on which the adhesive layer is formed has poor release properties, the influence of the Sa value on anti-blocking properties of the film tends to become large, and therefore, in such a case, the well-controlled Sa value may be effective to improve anti-blocking properties of the film, etc. However, if the Sa value is increased, the resulting film tends to have a high haze and therefore tends to be deteriorated in transparency. Thus, it is necessary to take suitable measures according to the applications of the film. In particular, in the case where importance is attached to transparency of the film, it is preferred that a release layer is provided on the film to improve anti-blocking properties thereof.

EXAMPLES

The present invention is described in more detail below by referring to the following Examples. However, these Examples are only illustrative and not intended to limit the present invention thereto, and other changes or modifications are also possible unless they depart from the scope of the present invention. In addition, the measuring and evaluating methods used in the present invention are as follows.

(1) Method of Measuring Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight ratio of 50:50, and a viscosity of the resulting solution was measured at 30° C.

(2) Method of Measuring Average Particle Diameter (d50; μm) of Particles:

Using a centrifugal precipitation type particle size distribution measuring apparatus "SA-CP3 Model" manufactured by Shimadzu Corp., the particle size corresponding to a cumulative fraction of 50% (on a weight basis) in equivalent spherical distribution of the particles was measured as an average particle diameter of the particles.

(3) Method of Measuring Arithmetic Average Roughness (Sa):

The surface of the film was measured for a surface roughness thereof using a non-contact surface/layer section profile measuring system "VertScan (registered trademark) R550GML" manufactured by Ryoka Systems Inc., under the following conditions: CCD camera: "SONY HR-50 1/3""; objective lens: magnification: 20 times; lens barrel: "1× Body"; zoom lens: "No Relay"; wavelength filter: "530 white"; measuring mode: "Wave", and the value outputted by correction according to a 4th-order polynomial was used as the arithmetic average roughness (Sa).

(4) Method of Measuring Thicknesses of Adhesive Layer and Functional Layer:

The surface of the adhesive layer or functional layer was dyed with $RuO_4$, and the resulting film was embedded in an epoxy resin. Thereafter, the resin-embedded film was cut into a piece by an ultrathin sectioning method, and the cut piece was dyed with $RuO_4$ to observe and measure a cut section of the adhesive layer using TEM ("H-7650" manufactured by Hitachi High-Technologies; accelerated voltage: 100 kV).

(5) Glass Transition Point:

Using a differential scanning calorimeter (DSC) "8500" manufactured by PerkinElmer Japan Co., Ltd., the glass transition point was measured in a temperature range of −100 to 200° C. at a temperature rise rate of 10° C./min.

(6) Method of Measuring Number-Average Molecular Weight:

The measurement of the molecular weight was conducted using a GPC apparatus "HLC-8120GPC" manufactured by Tosoh Corp. The number-average molecular weight was calculated in terms of polystyrene.

(7-1) Method of Evaluating Adhesion Strength (Adhesion Strength 1):

The surface of the adhesive layer of the adhesive film having a width of 5 cm according to the present invention was press-bonded onto a surface of a polymethyl methacrylate plate "COMOGLAS" (registered trademark; thickness: 1 mm) produced by KURARAY Co., Ltd., by moving a 2 kg rubber roller having a width of 5 cm thereover by one reciprocative motion. The resulting laminate was allowed to stand at room temperature for 1 hr to measure a peel force of the adhesive film required upon releasing the film from the polymethyl methacrylate plate. The measurement of the peel force was conducted by 180° peel test at an elastic stress rate of 300 mm/min using "Ezgraph" manufactured by Shimadzu Corporation.

(7-2) Method of Evaluating Adhesion Strength (Adhesion Strength 2):

The same procedure for evaluating the adhesive strength as described in the above item (7-1) was conducted except that the surface of the polyester film having no adhesive layer (thickness: 25 mm) obtained in the below-mentioned Comparative Example 1 was used instead of that of the polymethyl methacrylate plate used in the item (7-1).

(8) Method of Evaluating Adhesion Properties of Adhesive Layer:

One sheet of the A4 size adhesive film was folded to overlap portions of an adhesive layer thereof with each other, and the overlapped portions of the adhesive layer of the film were pressed against each other with fingers to evaluate adhesion properties of the film. The evaluation ratings of the adhesion properties of the film are as follows.

5 Points: Even in the case of lightly pressing the film with fingers, the overlapped portions of the adhesive layer could be adhered to each other, and the film was held in the folded round state;

4 Points: In the case of strongly pressing the film with fingers, the overlapped portions of the adhesive layer could be adhered to each other, and the film was held in the folded round state;

3 Points: In the case of strongly pressing the film with fingers, the overlapped portions of the adhesive layer could be adhered to each other, and the film was held in the folded round state for a while, but the overlapped portions of the adhesive layer were peeled off and delaminated from each other within 3 sec;

2 Points: In the case of strongly pressing the film with fingers, the film exhibited slight adhesion properties, but the folded round state of the film could not be held at all; and 1 Point: Even in the case of strongly pressing the film with fingers, the films failed to exhibit no adhesion properties.

The 3 or more points are preferred for practical used of the film.

(9) Method of Measuring Surface Resistance:

The surface resistance of the adhesive layer was measured by the method described in the below-mentioned (9-1). Since the method (9-1) was incapable of sufficiently measuring a surface resistivity of less than $1\times10^{8}$ •, the surface resistance of the film which was unmeasurable by the method (9-1) was measured by the below-mentioned method (9-2).

Meanwhile, the surface resistance exceeding $1\times10^{14}$ • was expressed by the mark "-".

(9-1) Using a high resistance meter "HP4339B" and a measuring electrode "HP16008B" both manufactured by Hewlett Packard Japan Ltd., after the polyester film was fully moisture-controlled in a measuring atmosphere of 23° C. and 50% RH, a voltage of 100 V was applied to the film for 1 min, and then the surface resistance of the coating layer of the film was measured.

(9-2) Using a low resistance meter "LORESTA GP MCP-T600" manufactured by Mitsubishi Chemical Corp., after the sample was moisture-controlled in a measuring atmosphere of 23° C. and 50% RH for 30 min, the surface resistance of the coating layer of the sample was measured.

(10) Method of Evaluating Deposition of Dirt and Dusts onto Functional Layer (Antistatic Layer) Side:

The polyester film was fully moisture-controlled in a measuring atmosphere of 23° C. and 50% RH, and then the antistatic layer of the film was rubbed with cotton cloth by 10 reciprocative motions. The thus rubbed antistatic layer of the film was slowly approached to finely crushed tobacco ash to evaluate adhesion of the ash thereonto according to the following evaluation ratings.

A: No ash was adhered onto the film even when contacted with the ash;

B: Extremely slight amount of ash was adhered onto the film when contacted with the ash;

C: Slight amount of ash was adhered onto the film when contacted with the ash; and D: A large amount of ash was adhered onto the film even when the film merely approached to the ash.

(11) Method of Measuring Anti-Blocking Properties:

The two polyester films to be measured were prepared and overlapped on each other such that the adhesive layer side of one polyester film was faced to the opposite side (i.e., the side of a functional layer, if any) of the other polyester film. The area of 12 cm×10 cm of the obtained laminate was pressed at 40° C. and 80% RH under 10 kg/cm$^2$ for 20 hr. Thereafter, the films were peeled off from each other by the method as prescribed in ASTM D1893 to measure a delamination load between the films.

Meanwhile, in the case where the film was not measurable for its delamination load with sufficient accuracy because the delamination load exceeded 300 g/cm, or in the case where the film suffered from breakage, the film is expressed by the mark "-".

(12) Method of Evaluating Adhesive Residue (Anti-Transfer Properties) of Adhesive Layer:

One sheet of the A4 size adhesive film was overlapped with the A4 size polyester film obtained in the below-mentioned Comparative Example 1 on which no adhesive layer was formed, such that the adhesive layer side of the adhesive film was faced and overlapped onto the latter polyester film, and the overlapped films were strongly pressed with fingers and laminated on each other. Then, the film having the adhesive layer was peeled off from the other film, and the surface of the film having no adhesive layer obtained in Comparative Example 1 was observed to evaluate adhesive residue thereon according to the following ratings.

A: No adhesive residue (no traces of transfer of the adhesive layer) was present;

B: Adhesive residue was present in the range of not more than 20% of film portions that were strongly pressed with fingers (slight traces of transfer of the adhesive layer); and C: Adhesive residue was present in the range of more than 20% of film portions that were strongly pressed with fingers.

The polyesters used in the respective Examples and Comparative Examples were prepared by the following methods.

<Method of Producing Polyester (A)>

One hundred parts by weight of dimethyl terephthalate and 60 parts by weight of ethylene glycol as well as ethyl acid phosphate and magnesium acetate tetrahydrate as a catalyst in amounts of 30 ppm and 100 ppm, respectively, based on the polyester as produced, were subjected to esterification reaction at 260° C. in a nitrogen atmosphere. Successively, tetrabutyl titanate in an amount of 50 ppm based on the polyester as produced was added to the reaction solution. While heating the resulting mixture to 280° C. over 2 hr and 30 min, the pressure of the reaction system was reduced to an absolute pressure of 0.3 kPa, and further the mixture was subjected to melt-polycondensation for 80 min, thereby obtaining a polyester (A) having an intrinsic viscosity of 0.63 and a diethylene glycol content of 2 mol %.

<Method of Producing Polyester (B)>

One hundred parts by weight of dimethyl terephthalate and 60 parts by weight of ethylene glycol as well as magnesium acetate tetrahydrate as a catalyst in an amount of 900 ppm based on the polyester as produced, were subjected to esterification reaction at 225° C. in a nitrogen atmosphere. Successively, orthophosphoric acid and germanium dioxide in amounts of 3500 ppm and 70 ppm, respectively, based on the polyester as produced, were added to the reaction solution. While heating the resulting mixture to 280° C. over 2 hr and 30 min, the pressure of the reaction system was reduced to an absolute pressure of 0.4 kPa, and further the mixture was subjected to melt-polycondensation for 85 min, thereby obtaining a polyester (B) having an intrinsic viscosity of 0.64 and a diethylene glycol content of 2 mol %.

<Method of Producing Polyester (C)>

The same procedure as used in the above method of producing the polyester (A) was conducted except that silica particles having an average particle diameter of 2 μm were added in an amount of 0.3 part by weight before the melt-polycondensation, thereby obtaining a polyester (C).

<Method of Producing Polyester (D)>

The same procedure as used in the above method of producing the polyester (A) was conducted except that silica particles having an average particle diameter of 3.2 μm were added in an amount of 0.6 part by weight before the melt-polycondensation, thereby obtaining a polyester (D).

Examples of compounds constituting the adhesive layer and the functional layer are as follows.

(Examples of Compounds)

Polyester Resin: (IA)

Water dispersion of polyester resin (glass transition point: −20° C.) obtained from the following composition:

Monomer composition: (acid component) dodecanedicarboxylic acid/terephthalic acid/isophthalic acid/5-sodium sulfoisophthalic acid//(diol component) ethylene glycol/1,4-butanediol=20/38/38/4//40/60 (mol %).

(Meth)Acrylic Resin: (IB)

Water dispersion of acrylic resin (glass transition point: −50° C.) obtained from the following composition:

2-Ethylhexyl acrylate/methyl methacrylate/methacrylic acid=85/12/3 (% by weight).

(Meth)Acrylic Resin: (IC)

Water dispersion of acrylic resin (glass transition point: −40° C.) obtained from the following composition:

2-Ethylhexyl acrylate/n-butyl acrylate/methyl methacrylate/2-hydroxyethyl methacrylate/acrylic acid=58/20/15/5/2 (% by weight).

Antistatic Agent (Conductive Polymer): (IIA)

Poly(3,4-ethylenedioxythiophene) using polystyrenesulfonic acid in combination therewith.

Antistatic Agent (Quaternary Ammonium Salt Compound): (IIB)

Polymer having a pyrrolidinium ring in a main chain thereof which was prepared by polymerizing the following composition:

Diallyl dimethyl ammonium chloride/dimethyl acrylamide/N-methylol acrylamide=90/5/5 (mol %). Number-average molecular weight: 30000.

Antistatic Agent (Ammonium Group-Containing Compound): (IIC)

High-molecular weight compound having a number-average molecular weight of 50000 and comprising a constitutional unit represented by the following formula (2) in which a counter ion is a methanesulfonic acid ion.

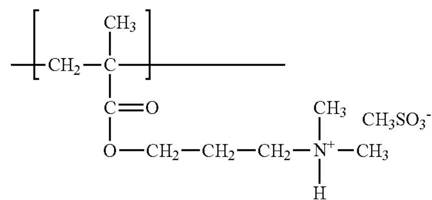

(2)

Antistatic Agent (Sulfonic Acid Group-Containing Compound): (IID)

Polymer compound having a number-average molecular weight of 20000 in the form of a homopolymer of styrenesulfonic aid and a salt thereof comprising sulfonic acid groups and sulfonic acid salt groups in a para-position, in which contents of sulfonic acid and a sulfonic acid sodium salt in the polymer are 90% and 10%, respectively.

Melamine Compound: (IIIA)

Hexamethoxymethylol melamine

Epoxy Compound: (IIIB)

Polyglycerol polyglycidyl ether as a polyfunctional polyepoxy compound.

Polyether Compound: (IV)

Adduct of polyethyleneoxide to a diglycerin structure; weight-average molecular weight: 350

Release Agent (Long-Chain Alkyl Group-Containing Compound): (VA)

A four-necked flask was charged with 200 parts of xylene and 600 parts of octadecyl isocyanate, and the contents of the flask were heated while stirring. From the time at which refluxing of xylene was initiated, 100 parts of polyvinyl alcohol having an average polymerization degree of 500 and a saponification degree of 88 mol % was added little by little to the flask at intervals of 10 min over about 2 hr. After completion of addition of the polyvinyl alcohol, the contents of the flask were further refluxed for 2 hr, and then the reaction thereof was terminated. The obtained reaction mixture was cooled to about 80° C., and then added to methanol, thereby obtaining a white precipitate as a reaction product. The resulting precipitate was separated from the reaction mixture by filtration, and 140 parts of xylene was added thereto. The obtained mixture was heated to completely dissolve the precipitate in xylene, and then methanol was added again thereto to obtain a precipitate. The above precipitation procedure was repeated several times. Thereafter, the resulting precipitate was washed with methanol, and then dried and pulverized, thereby obtaining the release agent.

Release Agent (Fluorine Compound): (VB)

Water dispersion of fluorine compound obtained from the following composition:

Octadecyl acrylate/perfluorohexylethyl methacrylate/vinyl chloride=66/17/17 (% by weight).

Polyether Group-Containing Condensation-Type Silicone: (VC)

Polyether group-containing silicone having a number-average molecular weight of 7000 and comprising polyethylene glycol (end group: hydroxyl group) having 8 ethylene glycol chains in which a molar ratio of polyethylene glycol to dimethyl siloxane were 1:100, on a side chain of the dimethyl silicone (assuming that a molar amount of a siloxane bond in the silicone is 1, a molar ratio of an ether bond in the polyether group to a siloxane bond in the silicone is 0.07). In the polyether group-containing condensation-type silicone, low molecular weight components having a number-average molecular weight of not more than 500 were present in an amount of 3%, and neither a vinyl group bonded to silicon (vinyl silane) nor a hydrogen group bonded to silicon (hydrogen silane) was present. Meanwhile, the present compound was used in the form of a water dispersion of the composition prepared by blending the polyether group-containing silicone with sodium dodecylbenzenesulfonate at a weight ratio of 1:0.25.

Wax: (VD)

Wax emulsion prepared by charging 300 g of a polyethyleneoxide wax having a melting point of 105° C., an acid value of 16 mgKOH/g, a density of 0.93 g/mL and a number-average molecular weight of 5000, 650 g of ion-exchanged water, 50 g of decaglycerol monooleate as a surfactant and 10 g of a 48% potassium hydroxide aqueous solution into a 1.5 L-capacity emulsification facility equipped with a stirrer, a thermometer and a temperature controller, followed by replacing an inside atmosphere of the facility with nitrogen and then hermetically sealing the facility; subjecting the contents of the facility to high-speed stirring at 150° C. for 1 hr and then cooling the contents of the facility to 130° C.; and allowing the resulting reaction mixture to pass through a high-pressure homogenizer under a pressure of 400 atm and then cooling the obtained mixture to 40° C.

Polyester Resin: (VIA)

Water dispersion of polyester resin (glass transition point: 50° C.) obtained from the following composition:

Monomer composition: (acid component) terephthalic acid/isophthalic acid/5-sodium sulfoisophthalic acid//(diol component) ethylene glycol/1,4-butanediol/diethylene glycol=50/46/4//70/20/10 (mol %).

(Meth)Acrylic Resin: (VIB)

Water dispersion of acrylic resin (glass transition point: 10° C.) obtained from the following composition:

Normal butyl acrylate/ethyl methacrylate/methyl methacrylate/2-hydroxyethyl methacrylate/acrylic acid=10/52/30/5/3 (% by weight).

(Meth)Acrylic Resin: (VIC)

Water dispersion of acrylic resin (glass transition point: 40° C.) obtained from the following composition:

Ethyl acrylate/methyl methacrylate/N-methylol acrylamide/acrylic acid=48/45/4/3 (% by weight).

Example 1

A mixed raw material obtained by mixing the polyesters (A), (B) and (C) in amounts of 91% by weight, 3% by weight and 6% by weight, respectively, as a raw material for outermost layers (surface layers), and a mixed raw material obtained by mixing the polyesters (A) and (B) in amounts of 97% by weight and 3% by weight, respectively, as a raw material for an intermediate layer, were respectively charged into two extruders, melted therein at 285° C., and then co-extruded therefrom on a chilled roll whose surface was controlled to a temperature of 40° C. into a two-kind/three-layer structure (surface layer/intermediate layer/surface layer=3:19:3 as output), followed by cooling and solidifying the thus extruded sheet on the chilled roll, thereby obtaining an undrawn sheet.

Next, the thus obtained undrawn sheet was drawn utilizing a difference between peripheral speeds of rolls at 85° C. at a draw ratio of 3.3 times in a longitudinal direction thereof. Thereafter, a coating solution A1 shown in Table 1 below was applied onto one side surface of the thus obtained longitudinally drawn film such that the thickness of the resulting adhesive layer (after drying) was 150 nm, and a coating solution B1 shown in Table 2 below was applied onto an opposite side surface of the longitudinally drawn film such that the thickness of the resulting functional layer (after drying) was 30 nm. Then, the resulting film was introduced into a tenter where the film was dried at 90° C. for 10 sec and then drawn at 110° C. at a draw ratio of 4.3 times in a lateral direction thereof, and further subjected to heat-setting treatment at 230° C. for 10 sec. Next, the obtained drawn film was relaxed by 2% in a lateral direction thereof, thereby obtaining a polyester film having a thickness of 25 μm and Sa of 9 nm as measured on the rear side surface of the film opposed to the adhesive layer (the surface on the side of the functional layer).

As a result of evaluating the thus obtained polyester film, it was confirmed that the polyester film had an adhesion strength of 6 mN/cm as measured by adhering to a polymethyl methacrylate plate and therefore could exhibit adequate adhesion properties, and also had a surface resistance of $2\times10^9$ • and therefore could exhibit good antistatic performance. In addition, the polyester film was free from adhesive residue (transfer properties) and therefore could exhibit good anti-transfer properties. Various properties of the thus obtained film are shown in Table 3 below.

Examples 2 to 77

The same procedure as in Example 1 was conducted except that the coating agent composition was changed to those shown in Tables 1 and 2, thereby obtaining polyester films. As shown in Tables 3 to 7, the resulting polyester films were excellent in adhesion strength, surface resistance and anti-transfer properties.

Example 78

A mixed raw material obtained by mixing the polyesters (A), (B) and (C) in amounts of 91% by weight, 3% by weight and 6% by weight, respectively, as a raw material for one outermost layer (surface layer 1), a mixed raw material obtained by mixing the polyesters (A), (B) and (D) in amounts of 72% by weight, 3% by weight and 25% by weight, respectively, as a raw material for the other outermost layer (surface layer 2), and a mixed raw material obtained by mixing the polyesters (A) and (B) in amounts of 97% by weight and 3% by weight, respectively, as a raw material for an intermediate layer, were respectively charged into two extruders, melted therein at 285° C., and then co-extruded therefrom on a chilled roll whose surface was controlled to a temperature of 40° C. into a three-kind/three-layer structure (surface layer 1/intermediate layer/surface layer 2=6:13:6 as output), followed by cooling and solidifying the thus extruded sheet on the chilled roll, thereby obtaining an undrawn sheet. Next, the thus obtained undrawn sheet was drawn utilizing a difference between peripheral speeds of rolls at 85° C. at a draw ratio of 3.3 times in a longitudinal direction thereof. Thereafter, a coating solution A1 shown in Table 1 below was applied onto the side of the surface layer 1 of the thus obtained longitudinally drawn film such that the thickness of the resulting adhesive layer (after drying) was 250 nm. Then, the resulting film was introduced into a tenter where the film was dried at 90° C. for 10 sec and then drawn at 110° C. at a draw ratio of 4.3 times in a lateral direction thereof, and further subjected to heat-setting treatment at 230° C. for 10 sec. Next, the obtained drawn film was relaxed by 2% in a lateral direction thereof, thereby obtaining a polyester film having a thickness of 25 μm and Sa of 30 nm as measured on the rear side surface of the film opposed to the adhesive layer (on the side of the surface layer 2, i.e., on the side of the functional layer).

As a result of evaluating the thus obtained polyester film, it was confirmed that the film had an adhesion strength of 10 mN/cm as measured by adhering to a polymethyl methacrylate plate and therefore could exhibit good adhesion properties, and also had a surface resistance of $1\times10^9$ • and therefore could exhibit good antistatic performance. In addition, the polyester film was free from adhesive residue (transfer properties) and therefore could exhibit good anti-transfer properties. Various properties of the thus obtained film are shown in Table 7 below.

Examples 79 to 84

The same procedure as in Example 78 was conducted except that the coating agent composition was changed to those shown in Table 1, thereby obtaining polyester films. As shown in Table 7, the resulting polyester films were excellent in adhesion strength, surface resistance and anti-transfer properties.

Example 85

A mixed raw material obtained by mixing the polyesters (A), (B) and (C) in amounts of 91% by weight, 3% by weight and 6% by weight, respectively, as a raw material for one outermost layer (surface layer 1), a mixed raw material obtained by mixing the polyesters (A), (B) and (D) in amounts of 47% by weight, 3% by weight and 50% by weight, respectively, as a raw material for the other outermost layer (surface layer 2), and a mixed raw material obtained by mixing the polyesters (A) and (B) in amounts of 97% by weight and 3% by weight, respectively, as a raw material for an intermediate layer, were respectively charged into two extruders, melted therein at 285° C., and then co-extruded therefrom on a chilled roll whose surface was controlled to a temperature of 40° C. into a three-kind/three-layer structure (surface layer 1/intermediate layer/surface layer 2=4:17:4 as output), followed by cooling and solidifying the thus extruded sheet on the chilled roll, thereby obtaining an undrawn sheet. Next, the thus obtained undrawn sheet was drawn utilizing a difference between peripheral speeds of rolls at 85° C. at a draw ratio of 3.3 times in a longitudinal direction thereof. Thereafter, a coating solution A1 shown in Table 1 below was applied onto the side of the surface layer 1 of the thus obtained longitudinally drawn film such that the thickness of the resulting adhesive layer (after drying) was 250 nm. Then, the resulting film was introduced into a tenter where the film was dried at 90° C. for 10 sec and then drawn at 110° C. at a draw ratio of 4.3 times in a lateral direction thereof, and further subjected to heat-setting treatment at 230° C. for 10 sec. Next, the obtained drawn film was relaxed by 2% in a lateral direction thereof, thereby obtaining a polyester film having a thickness of 25 μm and Sa of 55 nm as measured on the rear side surface of the film opposed to the adhesive layer.

As a result of evaluating the thus obtained polyester film, it was confirmed that the film had an adhesion strength of 10 mN/cm as measured by adhering to a polymethyl methacrylate plate and therefore could exhibit good adhesion properties, and also had a surface resistance of $1\times10^9$ • and therefore could exhibit good antistatic performance. In addition, the polyester film was free from adhesive residue (transfer properties) and therefore could exhibit good anti-transfer properties. Various properties of the thus obtained film are shown in Table 7 below.

Examples 86 to 91

The same procedure as in Example 85 was conducted except that the coating agent composition was changed to those shown in Table 1, thereby obtaining polyester films. As shown in Table 7, the resulting polyester films were excellent in adhesion strength, surface resistance and anti-transfer properties.

Example 92

The same procedure as in Example 1 was conducted except that no adhesive layer was provided, thereby obtaining a polyester film. The thus obtained polyester film having no adhesive layer was coated with a coating solution A4 shown in Table 1 below such that the resulting adhesive layer had a thickness of 350 nm (after drying), and then dried at 100° C. for 1 min, thereby obtaining the polyester film on which the undrawn adhesive layer was formed and laminated by an off-line coating method. As shown in Table 7, the resulting polyester film had good adhesion strength and surface resistance, but the film suffered from large adhesive residue (transfer properties).

Comparative Example 1

The same procedure as in Example 1 was conducted except that neither an adhesive layer nor a functional layer was provided, thereby obtaining a polyester film. As a result of evaluating the resulting polyester film, it was confirmed that as shown in Table 8 below, the film had neither adhesion strength nor surface resistance.

Comparative Examples 2 to 9

The same procedure as in Example 1 was conducted except that the coating agent composition was changed to those shown in Table 1, thereby obtaining polyester films. As a result, it was confirmed that as shown in Table 8, some of the resulting polyester films had no adhesion strength or poor surface resistance.

Comparative Example 10

The polyester film having neither an adhesive layer nor a functional layer which was obtained in Comparative Example 1 was coated with a coating solution C1 shown in Table 1 below, and dried at 100° C. for 3 min such that the resulting adhesive layer had a thickness of 20 μm (after drying), thereby obtaining a polyester film on which the undrawn adhesive layer was formed by an off-line coating method. The resulting coated film was adhered onto the polyester film having neither an adhesive layer nor a functional layer which was obtained in Comparative Example 1 such that the adhesive layer of the coated film was contacted with the polyester film, and then cut. As a result, there occurred squeeze-out of components of the adhesive layer which was never observed in the respective Examples, so that a fear of contamination of an adherend with the adhesive components was caused. Also, the adhesion strength of the film was accurately unmeasurable. The other properties of the film are shown in Table 8.

TABLE 1

| Coating | Coating agent composition (wt %) based on nonvolatile components | | | | | |
|---|---|---|---|---|---|---|
| solution | IA | IB | IC | IIA | IIB | IID |
| A1 | 90 | 0 | 0 | 10 | 0 | 0 |
| A2 | 95 | 0 | 0 | 5 | 0 | 0 |
| A3 | 80 | 0 | 0 | 5 | 0 | 0 |
| A4 | 88 | 0 | 0 | 2 | 0 | 0 |
| A5 | 98 | 0 | 0 | 2 | 0 | 0 |
| A6 | 93 | 0 | 0 | 2 | 0 | 0 |
| A7 | 78 | 0 | 0 | 2 | 0 | 0 |
| A8 | 99 | 0 | 0 | 1 | 0 | 0 |
| A9 | 0 | 70 | 0 | 10 | 0 | 0 |
| A10 | 0 | 85 | 0 | 5 | 0 | 0 |
| A11 | 0 | 88 | 0 | 2 | 0 | 0 |
| A12 | 0 | 0 | 85 | 5 | 0 | 0 |
| A13 | 0 | 70 | 0 | 0 | 30 | 0 |
| A14 | 0 | 70 | 0 | 0 | 0 | 20 |
| C1 | 100 | 0 | 0 | 0 | 0 | 0 |
| C2 | 0 | 100 | 0 | 0 | 0 | 0 |
| C3 | 0 | 0 | 0 | 0 | 0 | 0 |
| C4 | 0 | 0 | 0 | 10 | 0 | 0 |
| C5 | 0 | 0 | 0 | 0 | 0 | 0 |
| C6 | 0 | 0 | 0 | 10 | 0 | 0 |
| C7 | 0 | 0 | 0 | 0 | 0 | 0 |

| Coating | Coating agent composition (wt %) based on nonvolatile components | | | | | |
|---|---|---|---|---|---|---|
| solution | IIIA | IIIB | IV | VIA | VIB | VIC |
| A1 | 0 | 0 | 0 | 0 | 0 | 0 |
| A2 | 0 | 0 | 0 | 0 | 0 | 0 |
| A3 | 10 | 0 | 5 | 0 | 0 | 0 |
| A4 | 0 | 0 | 10 | 0 | 0 | 0 |
| A5 | 0 | 0 | 0 | 0 | 0 | 0 |

TABLE 1-continued

| | | | | | | |
|---|---|---|---|---|---|---|
| A6 | 0 | 0 | 5 | 0 | 0 | 0 |
| A7 | 0 | 0 | 20 | 0 | 0 | 0 |
| A8 | 0 | 0 | 0 | 0 | 0 | 0 |
| A9 | 0 | 0 | 20 | 0 | 0 | 0 |
| A10 | 0 | 0 | 10 | 0 | 0 | 0 |
| A11 | 0 | 0 | 10 | 0 | 0 | 0 |
| A12 | 0 | 0 | 10 | 0 | 0 | 0 |
| A13 | 0 | 0 | 0 | 0 | 0 | 0 |
| A14 | 0 | 10 | 0 | 0 | 0 | 0 |
| C1 | 0 | 0 | 0 | 0 | 0 | 0 |
| C2 | 0 | 0 | 0 | 0 | 0 | 0 |
| C3 | 0 | 0 | 0 | 100 | 0 | 0 |
| C4 | 0 | 0 | 0 | 90 | 0 | 0 |
| C5 | 0 | 0 | 0 | 0 | 100 | 0 |
| C6 | 0 | 0 | 20 | 0 | 70 | 0 |
| C7 | 0 | 0 | 0 | 0 | 0 | 100 |

TABLE 2

| Coating | Coating agent composition (wt %) based on nonvolatile components | | | | | | | | |
|---|---|---|---|---|---|---|---|---|---|
| solution | VA | VB | VC | VD | VIA | VIC | IIIA | IIB | IIC |
| B1 | 30 | 0 | 0 | 0 | 0 | 0 | 70 | 0 | 0 |
| B2 | 65 | 0 | 0 | 0 | 0 | 0 | 35 | 0 | 0 |
| B3 | 85 | 0 | 0 | 0 | 0 | 0 | 15 | 0 | 0 |
| B4 | 15 | 0 | 0 | 0 | 45 | 0 | 40 | 0 | 0 |
| B5 | 0 | 85 | 0 | 0 | 0 | 0 | 15 | 0 | 0 |
| B6 | 0 | 0 | 20 | 0 | 45 | 0 | 35 | 0 | 0 |
| B7 | 0 | 0 | 0 | 35 | 30 | 0 | 35 | 0 | 0 |
| B8 | 0 | 0 | 35 | 0 | 0 | 0 | 25 | 40 | 0 |
| B9 | 25 | 0 | 0 | 0 | 0 | 20 | 25 | 30 | 0 |
| B10 | 30 | 0 | 0 | 0 | 0 | 10 | 20 | 0 | 40 |
| C8 | 0 | 0 | 0 | 0 | 70 | 0 | 30 | 0 | 0 |

TABLE 3

| | Adhesive layer | | Functional layer | |
|---|---|---|---|---|
| Examples | Coating solution | Thickness (nm) | Coating solution | Thickness (nm) |
| Example 1 | A1 | 150 | B1 | 30 |
| Example 2 | A1 | 250 | B1 | 30 |
| Example 3 | A2 | 350 | B1 | 30 |
| Example 4 | A3 | 400 | B1 | 30 |
| Example 5 | A4 | 350 | B1 | 30 |
| Example 6 | A5 | 480 | B1 | 30 |
| Example 7 | A6 | 480 | B1 | 30 |
| Example 8 | A7 | 480 | B1 | 30 |
| Example 9 | A8 | 480 | B1 | 30 |
| Example 10 | A9 | 250 | B1 | 30 |
| Example 11 | A10 | 400 | B1 | 30 |
| Example 12 | A11 | 480 | B1 | 30 |
| Example 13 | A12 | 400 | B1 | 30 |
| Example 14 | A13 | 150 | B1 | 30 |
| Example 15 | A14 | 200 | B1 | 30 |
| Example 16 | A1 | 250 | B2 | 30 |
| Example 17 | A4 | 350 | B2 | 30 |
| Example 18 | A6 | 480 | B2 | 30 |
| Example 19 | A9 | 250 | B2 | 30 |
| Example 20 | A10 | 400 | B2 | 30 |
| Example 21 | A1 | 250 | B3 | 30 |
| Example 22 | A4 | 350 | B3 | 30 |
| Example 23 | A6 | 480 | B3 | 30 |
| Example 24 | A9 | 250 | B3 | 30 |
| Example 25 | A10 | 400 | B3 | 30 |
| Example 26 | A1 | 250 | B4 | 30 |
| Example 27 | A4 | 350 | B4 | 30 |
| Example 28 | A6 | 480 | B4 | 30 |
| Example 29 | A9 | 250 | B4 | 30 |
| Example 30 | A10 | 400 | B4 | 30 |

TABLE 3-continued

| Examples | Adhesion strength 1 (mN/cm) | Adhesion strength 2 (mN/cm) | Adhesion properties | Surface resistance of adhesive layer (•) |
|---|---|---|---|---|
| Example 1 | 6 | 6 | 3 | $2 \times 10^{9}$ |
| Example 2 | 10 | 10 | 3 | $1 \times 10^{9}$ |
| Example 3 | 30 | 40 | 5 | $4 \times 10^{12}$ |
| Example 4 | 20 | 30 | 5 | $8 \times 10^{9}$ |
| Example 5 | 20 | 30 | 5 | $3 \times 10^{7}$ |
| Example 6 | 60 | 70 | 5 | $3 \times 10^{10}$ |
| Example 7 | 60 | 80 | 5 | $6 \times 10^{7}$ |
| Example 8 | 50 | 60 | 5 | $1 \times 10^{9}$ |
| Example 9 | 60 | 70 | 5 | $4 \times 10^{12}$ |
| Example 10 | 10 | 8 | 5 | $8 \times 10^{10}$ |
| Example 11 | 20 | 20 | 5 | $2 \times 10^{11}$ |
| Example 12 | 100 | 45 | 5 | $5 \times 10^{13}$ |
| Example 13 | 20 | 10 | 5 | $1 \times 10^{11}$ |
| Example 14 | 5 | 3 | 3 | $6 \times 10^{8}$ |
| Example 15 | 10 | 5 | 3 | $1 \times 10^{10}$ |
| Example 16 | 10 | 10 | 3 | $1 \times 10^{9}$ |
| Example 17 | 20 | 30 | 5 | $3 \times 10^{7}$ |
| Example 18 | 60 | 80 | 5 | $6 \times 10^{7}$ |
| Example 19 | 10 | 8 | 5 | $8 \times 10^{10}$ |
| Example 20 | 20 | 20 | 5 | $2 \times 10^{11}$ |
| Example 21 | 10 | 10 | 3 | $1 \times 10^{9}$ |
| Example 22 | 20 | 30 | 5 | $3 \times 10^{7}$ |
| Example 23 | 60 | 80 | 5 | $6 \times 10^{7}$ |
| Example 24 | 10 | 8 | 5 | $8 \times 10^{10}$ |
| Example 25 | 20 | 20 | 5 | $2 \times 10^{11}$ |
| Example 26 | 10 | 10 | 3 | $1 \times 10^{9}$ |
| Example 27 | 20 | 30 | 5 | $3 \times 10^{7}$ |
| Example 28 | 60 | 80 | 5 | $6 \times 10^{7}$ |
| Example 29 | 10 | 8 | 5 | $8 \times 10^{10}$ |
| Example 30 | 20 | 20 | 5 | $2 \times 10^{11}$ |

| Examples | Deposition of dirt and dusts on adhesive layer | Anti-blocking properties (g/cm) | Anti-transfer properties |
|---|---|---|---|
| Example 1 | A | 4 | A |
| Example 2 | A | 6 | A |
| Example 3 | B | 8 | B |
| Example 4 | A | 4 | B |
| Example 5 | A | 7 | B |
| Example 6 | A | 9 | B |
| Example 7 | A | 9 | B |
| Example 8 | A | 8 | B |
| Example 9 | B | 9 | B |
| Example 10 | A | 3 | A |
| Example 11 | A | 6 | A |
| Example 12 | C | 7 | A |
| Example 13 | A | 5 | A |
| Example 14 | A | 3 | A |
| Example 15 | A | 4 | A |
| Example 16 | A | 5 | A |
| Example 17 | A | 6 | B |
| Example 18 | A | 8 | B |
| Example 19 | A | 3 | A |
| Example 20 | A | 5 | A |
| Example 21 | A | 4 | A |
| Example 22 | A | 5 | B |
| Example 23 | A | 7 | B |
| Example 24 | A | 2 | A |
| Example 25 | A | 4 | A |
| Example 26 | A | 20 | A |
| Example 27 | A | 40 | B |
| Example 28 | A | 70 | B |
| Example 29 | A | 10 | A |
| Example 30 | A | 20 | A |

TABLE 4

| Examples | Adhesive layer | | Functional layer | |
|---|---|---|---|---|
| | Coating solution | Thickness (nm) | Coating solution | Thickness (nm) |
| Example 31 | A1 | 250 | B5 | 30 |
| Example 32 | A4 | 350 | B5 | 30 |
| Example 33 | A6 | 480 | B5 | 30 |
| Example 34 | A9 | 250 | B5 | 30 |
| Example 35 | A10 | 400 | B5 | 30 |
| Example 36 | A13 | 150 | B5 | 30 |
| Example 37 | A14 | 200 | B5 | 30 |
| Example 38 | A1 | 250 | B6 | 50 |
| Example 39 | A4 | 350 | B6 | 50 |
| Example 40 | A6 | 480 | B6 | 50 |
| Example 41 | A9 | 250 | B6 | 50 |
| Example 42 | A10 | 400 | B6 | 50 |
| Example 43 | A13 | 150 | B6 | 50 |
| Example 44 | A14 | 200 | B6 | 50 |
| Example 45 | A1 | 250 | B7 | 30 |
| Example 46 | A4 | 350 | B7 | 30 |
| Example 47 | A6 | 480 | B7 | 30 |
| Example 48 | A9 | 250 | B7 | 30 |
| Example 49 | A10 | 400 | B7 | 30 |
| Example 50 | A13 | 150 | B7 | 50 |
| Example 51 | A14 | 200 | B7 | 50 |

| Examples | Adhesion strength 1 (mN/cm) | Adhesion strength 2 (mN/cm) | Adhesion properties | Surface resistance of adhesive layer (•) |
|---|---|---|---|---|
| Example 31 | 10 | 10 | 3 | $1 \times 10^{9}$ |
| Example 32 | 20 | 30 | 5 | $3 \times 10^{7}$ |
| Example 33 | 60 | 80 | 5 | $6 \times 10^{7}$ |
| Example 34 | 10 | 8 | 5 | $8 \times 10^{10}$ |
| Example 35 | 20 | 20 | 5 | $2 \times 10^{11}$ |
| Example 36 | 5 | 3 | 3 | $6 \times 10^{8}$ |
| Example 37 | 10 | 5 | 3 | $1 \times 10^{10}$ |
| Example 38 | 10 | 10 | 3 | $1 \times 10^{9}$ |
| Example 39 | 20 | 30 | 5 | $3 \times 10^{7}$ |
| Example 40 | 60 | 80 | 5 | $6 \times 10^{7}$ |
| Example 41 | 10 | 8 | 5 | $8 \times 10^{10}$ |
| Example 42 | 20 | 20 | 5 | $2 \times 10^{11}$ |
| Example 43 | 5 | 3 | 3 | $6 \times 10^{8}$ |
| Example 44 | 10 | 5 | 3 | $1 \times 10^{10}$ |
| Example 45 | 10 | 10 | 3 | $1 \times 10^{9}$ |
| Example 46 | 20 | 30 | 5 | $3 \times 10^{7}$ |
| Example 47 | 60 | 80 | 5 | $6 \times 10^{7}$ |
| Example 48 | 10 | 8 | 5 | $8 \times 10^{10}$ |
| Example 49 | 20 | 20 | 5 | $2 \times 10^{11}$ |
| Example 50 | 5 | 3 | 3 | $6 \times 10^{8}$ |
| Example 51 | 10 | 5 | 3 | $1 \times 10^{10}$ |

| Examples | Deposition of dirt and dusts on adhesive layer | Anti-blocking properties (g/cm) | Anti-transfer properties |
|---|---|---|---|
| Example 31 | A | 4 | A |
| Example 32 | A | 5 | B |
| Example 33 | A | 7 | B |
| Example 34 | A | 2 | A |
| Example 35 | A | 4 | A |
| Example 36 | A | 3 | A |
| Example 37 | A | 4 | A |
| Example 38 | A | 1 | A |
| Example 39 | A | 2 | B |
| Example 40 | A | 2 | B |
| Example 41 | A | 1 | A |
| Example 42 | A | 1 | A |
| Example 43 | A | 1 | A |
| Example 44 | A | 1 | A |
| Example 45 | A | 20 | A |
| Example 46 | A | 40 | B |
| Example 47 | A | 80 | B |
| Example 48 | A | 10 | A |
| Example 49 | A | 20 | A |
| Example 50 | A | 10 | A |
| Example 51 | A | 10 | A |

TABLE 5

| Examples | Adhesive layer | | Functional layer | |
|---|---|---|---|---|
| | Coating solution | Thickness (nm) | Coating solution | Thickness (nm) |
| Example 52 | A1 | 250 | B8 | 50 |
| Example 53 | A4 | 350 | B8 | 50 |
| Example 54 | A6 | 480 | B8 | 50 |
| Example 55 | A9 | 250 | B8 | 50 |
| Example 56 | A10 | 400 | B8 | 50 |
| Example 57 | A13 | 150 | B8 | 50 |
| Example 58 | A14 | 200 | B8 | 50 |
| Example 59 | A1 | 250 | B9 | 30 |
| Example 60 | A4 | 350 | B9 | 30 |
| Example 61 | A6 | 480 | B9 | 30 |
| Example 62 | A9 | 250 | B9 | 30 |
| Example 63 | A10 | 400 | B9 | 30 |
| Example 64 | A13 | 150 | B9 | 30 |
| Example 65 | A14 | 200 | B9 | 30 |
| Example 66 | A1 | 250 | B10 | 30 |
| Example 67 | A4 | 350 | B10 | 30 |
| Example 68 | A6 | 480 | B10 | 30 |
| Example 69 | A9 | 250 | B10 | 30 |
| Example 70 | A10 | 400 | B10 | 30 |
| Example 71 | A13 | 150 | B10 | 30 |
| Example 72 | A14 | 200 | B10 | 30 |

| Examples | Adhesion strength 1 (mN/cm) | Adhesion strength 2 (mN/cm) | Adhesion properties | Surface resistance of adhesive layer (•) |
|---|---|---|---|---|
| Example 52 | 10 | 10 | 3 | $1 \times 10^{9}$ |
| Example 53 | 20 | 30 | 5 | $3 \times 10^{7}$ |
| Example 54 | 60 | 80 | 5 | $6 \times 10^{7}$ |
| Example 55 | 10 | 8 | 5 | $8 \times 10^{10}$ |
| Example 56 | 20 | 20 | 5 | $2 \times 10^{11}$ |
| Example 57 | 5 | 3 | 3 | $6 \times 10^{8}$ |
| Example 58 | 10 | 5 | 3 | $1 \times 10^{10}$ |
| Example 59 | 10 | 10 | 3 | $1 \times 10^{9}$ |
| Example 60 | 20 | 30 | 5 | $3 \times 10^{7}$ |
| Example 61 | 60 | 80 | 5 | $6 \times 10^{7}$ |
| Example 62 | 10 | 8 | 5 | $8 \times 10^{10}$ |
| Example 63 | 20 | 20 | 5 | $2 \times 10^{11}$ |
| Example 64 | 5 | 3 | 3 | $6 \times 10^{8}$ |
| Example 65 | 10 | 5 | 3 | $1 \times 10^{10}$ |
| Example 66 | 10 | 10 | 3 | $1 \times 10^{9}$ |
| Example 67 | 20 | 30 | 5 | $3 \times 10^{7}$ |
| Example 68 | 60 | 80 | 5 | $6 \times 10^{7}$ |
| Example 69 | 10 | 8 | 5 | $8 \times 10^{10}$ |
| Example 70 | 20 | 20 | 5 | $2 \times 10^{11}$ |
| Example 71 | 5 | 3 | 3 | $6 \times 10^{8}$ |
| Example 72 | 10 | 5 | 3 | $1 \times 10^{10}$ |

| Examples | Deposition of dirt and dusts on adhesive layer | Anti-blocking properties (g/cm) | Anti-transfer properties |
|---|---|---|---|
| Example 52 | A | 1 | A |
| Example 53 | A | 2 | B |
| Example 54 | A | 2 | B |
| Example 55 | A | 1 | A |
| Example 56 | A | 1 | A |
| Example 57 | A | 1 | A |
| Example 58 | A | 1 | A |
| Example 59 | A | 7 | A |
| Example 60 | A | 8 | B |
| Example 61 | A | 10 | B |
| Example 62 | A | 3 | A |
| Example 63 | A | 7 | A |
| Example 64 | A | 3 | A |
| Example 65 | A | 4 | A |
| Example 66 | A | 6 | A |
| Example 67 | A | 7 | B |
| Example 68 | A | 9 | B |
| Example 69 | A | 3 | A |
| Example 70 | A | 6 | A |
| Example 71 | A | 3 | A |
| Example 72 | A | 4 | A |

TABLE 6

| Examples | Surface resistance of functional layer (•) | Deposition of dirt and dusts on functional layer |
|---|---|---|
| Example 52 | 2 × $10^{9}$ | A |
| Example 53 | 2 × $10^{9}$ | A |
| Example 54 | 2 × $10^{9}$ | A |
| Example 55 | 2 × $10^{9}$ | A |
| Example 56 | 2 × $10^{9}$ | A |
| Example 57 | 2 × $10^{9}$ | A |
| Example 58 | 2 × $10^{9}$ | A |
| Example 59 | 1 × $10^{10}$ | A |
| Example 60 | 1 × $10^{10}$ | A |
| Example 61 | 1 × $10^{10}$ | A |
| Example 62 | 1 × $10^{10}$ | A |
| Example 63 | 1 × $10^{10}$ | A |
| Example 64 | 1 × $10^{10}$ | A |
| Example 65 | 1 × $10^{10}$ | A |
| Example 66 | 1 × $10^{10}$ | A |
| Example 67 | 1 × $10^{10}$ | A |
| Example 68 | 1 × $10^{10}$ | A |
| Example 69 | 1 × $10^{10}$ | A |
| Example 70 | 1 × $10^{10}$ | A |
| Example 71 | 1 × $10^{10}$ | A |
| Example 72 | 1 × $10^{10}$ | A |

TABLE 7

| Examples | Adhesive layer | | Functional layer | |
|---|---|---|---|---|
| | Coating solution | Thickness (nm) | Coating solution | Thickness (nm) |
| Example 73 | A4 | 350 | — | — |
| Example 74 | A6 | 480 | — | — |
| Example 75 | A9 | 250 | — | — |
| Example 76 | A10 | 400 | — | — |
| Example 77 | A4 | 350 | C8 | 30 |
| Example 78 | A1 | 250 | — | — |
| Example 79 | A4 | 350 | — | — |
| Example 80 | A6 | 480 | — | — |
| Example 81 | A9 | 250 | — | — |
| Example 82 | A10 | 400 | — | — |
| Example 83 | A13 | 150 | — | — |
| Example 84 | A14 | 200 | — | — |
| Example 85 | A1 | 250 | — | — |
| Example 86 | A4 | 350 | — | — |
| Example 87 | A6 | 480 | — | — |
| Example 88 | A9 | 250 | — | — |
| Example 89 | A10 | 400 | — | — |
| Example 90 | A13 | 150 | — | — |
| Example 91 | A14 | 200 | — | — |
| Example 92 | A4 | 350 | B1 | 30 |

| Examples | Adhesion strength 1 (mN/cm) | Adhesion strength 2 (mN/cm) | Adhesion properties | Surface resistance of adhesive layer (•) |
|---|---|---|---|---|
| Example 73 | 20 | 30 | 5 | 3 × $10^{7}$ |
| Example 74 | 60 | 80 | 5 | 6 × $10^{7}$ |
| Example 75 | 10 | 8 | 5 | 8 × $10^{10}$ |
| Example 76 | 20 | 20 | 5 | 2 × $10^{11}$ |
| Example 77 | 20 | 30 | 5 | 3 × $10^{7}$ |
| Example 78 | 10 | 10 | 3 | 1 × $10^{9}$ |
| Example 79 | 20 | 30 | 5 | 3 × $10^{7}$ |
| Example 80 | 60 | 80 | 5 | 6 × $10^{7}$ |
| Example 81 | 10 | 8 | 5 | 8 × $10^{10}$ |
| Example 82 | 20 | 20 | 5 | 2 × $10^{11}$ |
| Example 83 | 5 | 3 | 3 | 6 × $10^{8}$ |
| Example 84 | 10 | 5 | 3 | 1 × $10^{10}$ |
| Example 85 | 10 | 10 | 3 | 1 × $10^{9}$ |
| Example 86 | 20 | 30 | 5 | 3 × $10^{7}$ |
| Example 87 | 60 | 80 | 5 | 6 × $10^{7}$ |
| Example 88 | 10 | 8 | 5 | 8 × $10^{10}$ |
| Example 89 | 20 | 20 | 5 | 2 × $10^{11}$ |
| Example 90 | 5 | 3 | 3 | 6 × $10^{8}$ |
| Example 91 | 10 | 5 | 3 | 1 × $10^{10}$ |
| Example 92 | 30 | 30 | 5 | 1 × $10^{7}$ |

TABLE 7-continued

| Examples | Deposition of dirt and dusts on adhesive layer | Anti-blocking properties (g/cm) | Anti-transfer properties |
|---|---|---|---|
| Example 73 | A | — | B |
| Example 74 | A | — | B |
| Example 75 | A | — | A |
| Example 76 | A | — | A |
| Example 77 | A | — | B |
| Example 78 | A | 80 | A |
| Example 79 | A | 100 | B |
| Example 80 | A | 200 | B |
| Example 81 | A | 20 | A |
| Example 82 | A | 60 | A |
| Example 83 | A | 20 | A |
| Example 84 | A | 30 | A |
| Example 85 | A | 50 | A |
| Example 86 | A | 70 | B |
| Example 87 | A | 100 | B |
| Example 88 | A | 10 | A |
| Example 89 | A | 40 | A |
| Example 90 | A | 10 | A |
| Example 91 | A | 20 | A |
| Example 92 | A | — | C |

TABLE 8

| Comparative Examples | Adhesive layer | | Functional layer | |
|---|---|---|---|---|
| | Coating solution | Thickness (nm) | Coating solution | Thickness (nm) |
| Comparative Example 1 | — | — | — | — |
| Comparative Example 2 | C1 | 350 | B1 | 30 |
| Comparative Example 3 | C2 | 150 | B1 | 30 |
| Comparative Example 4 | C2 | 250 | B1 | 30 |
| Comparative Example 5 | C3 | 350 | B1 | 30 |
| Comparative Example 6 | C4 | 150 | B1 | 30 |
| Comparative Example 7 | C5 | 350 | B1 | 30 |
| Comparative Example 8 | C6 | 250 | B1 | 30 |
| Comparative Example 9 | C7 | 350 | B1 | 30 |
| Comparative Example 10 | C1 | 20000 | — | — |

| Comparative Examples | Adhesion strength 1 (mN/cm) | Adhesion strength 2 (mN/cm) | Adhesion properties | Surface resistance of adhesive layer (•) |
|---|---|---|---|---|
| Comparative Example 1 | 0 | 0 | 1 | — |
| Comparative Example 2 | 50 | 70 | 5 | — |
| Comparative Example 3 | 50 | 10 | 5 | — |
| Comparative Example 4 | 70 | 30 | 5 | — |
| Comparative Example 5 | 0 | 0 | 1 | — |
| Comparative Example 6 | 0 | 0 | 1 | 2 × $10^{8}$ |
| Comparative Example 7 | 0 | 0 | 1 | — |
| Comparative Example 8 | 0 | 0 | 1 | 5 × $10^{5}$ |

TABLE 8-continued

| Comparative Example 9 | 0 | 0 | 1 | — |
|---|---|---|---|---|
| Comparative Example 10 | — | — | — | — |

| Comparative Examples | Deposition of dirt and dusts on adhesive layer | Anti-blocking properties (g/cm) | Anti-transfer properties |
|---|---|---|---|
| Comparative Example 1 | D | — | A |
| Comparative Example 2 | D | 8 | A |
| Comparative Example 3 | D | 2 | A |
| Comparative Example 4 | D | 4 | A |
| Comparative Example 5 | D | 1 | A |
| Comparative Example 6 | A | 1 | A |
| Comparative Example 7 | D | 1 | A |
| Comparative Example 8 | A | 1 | A |
| Comparative Example 9 | D | 1 | A |
| Comparative Example 10 | — | — | C |

INDUSTRIAL APPLICABILITY

The adhesive film according to the present invention can be suitably used, for example, in the applications such as a surface protective film used for preventing formation of scratches or deposition of contaminants upon transportation, storage or processing of resin plates, metal plates, etc., in which the film is required to have less fisheyes, excellent mechanical strength and heat resistance, less deposition of dirt and dusts as well as good adhesion properties.

The invention claimed is:

1. An adhesive film comprising a polyester film and an adhesive layer formed on at least one surface of the polyester film and having a thickness of 1 to 700 nm, in which the polyester film consists of a polyester, and in which the adhesive layer is formed by applying a coating solution consisting of:

a (meth)acrylic resin containing a (meth)acrylate unit with an alkyl group having not less than 4 carbon atoms at an ester end thereof, wherein the (meth)acrylic resin has a glass transition point of not higher than −30° C., an antistatic agent, and a solvent.

2. The adhesive film according to claim 1, further comprising a functional layer formed on a surface of the polyester film which is opposite to the surface provided with the adhesive layer.

3. The adhesive film according to claim 1, wherein the antistatic agent is a polymer-type antistatic agent.

4. The adhesive film according to claim 3, wherein the polymer-type antistatic agent comprises a conductive polymer.

5. The adhesive film according to claim 1, wherein the adhesive layer has an adhesion strength to a polymethyl methacrylate plate of 1 to 5000 mN/cm.

6. A process for producing an adhesive film, comprising the steps of:

forming an adhesive layer on at least one surface of a polyester film to prepare a coated film; and drawing the coated film in at least one direction thereof, wherein the polyester film consists of polyester, and wherein the adhesive layer is formed by applying a coating solution consisting of:

a (meth)acrylic resin containing a (meth)acrylate unit with an alkyl group having not less than 4 carbon atoms at an ester end thereof, wherein the (meth)acrylic resin has a glass transition point of not higher than −30° C., an antistatic agent, and a solvent.

7. The process for producing an adhesive film according to claim 6, wherein the adhesive film further comprises a functional layer formed on a surface of the polyester film which is opposite to the surface provided with the adhesive layer.

8. The process for producing an adhesive film according to claim 6, wherein the antistatic agent is a polymer-type antistatic agent.

9. The process for producing an adhesive film according to claim 8, wherein the polymer-type antistatic agent comprises a conductive polymer.

10. The process for producing an adhesive film according to claim 6, wherein the adhesive layer has an adhesion strength to a polymethyl methacrylate plate of 1 to 5000 mN/cm.

11. An adhesive film comprising a polyester film and an adhesive layer formed on at least one surface of the polyester film and having a thickness of 1 to 700 nm, in which the polyester film consists of a polyester, and at least one additive selected from the group consisting of particles selected from the group consisting of silica, calcium carbonate, magnesium carbonate, barium carbonate, calcium sulfate, calcium phosphate, magnesium phosphate, kaolin, aluminum oxide, zirconium oxide, and titanium oxide, an ultraviolet absorber, an antioxidant, an antistatic agent, a thermal stabilizer, and a lubricant, in which the adhesive layer is formed by applying a coating solution consisting of:

a (meth)acrylic resin containing a (meth)acrylate unit with an alkyl group having not less than 4 carbon atoms at an ester end thereof, wherein the (meth)acrylic resin has a glass transition point of not higher than −30° C., an antistatic agent, and a solvent.

12. The adhesive film according to claim 11, further comprising a functional layer formed on a surface of the polyester film which is opposite to the surface provided with the adhesive layer.

13. The adhesive film according to claim 11, wherein the antistatic agent in the coating solution is a polymer-type antistatic agent.

14. The adhesive film according to claim 13, wherein the polymer-type antistatic agent comprises a conductive polymer.

15. The adhesive film according to claim 11, wherein the adhesive layer has an adhesion strength to a polymethyl methacrylate plate of 1 to 5000 mN/cm.

16. An adhesive film comprising a polyester film and an adhesive layer formed on at least one surface of the polyester film and having a thickness of 1 to 700 nm, in which the polyester film consists of a polyester, and in which the adhesive layer is formed by applying a coating solution consisting of:

a (meth)acrylic resin containing a (meth)acrylate unit with an alkyl group having not less than 4 carbon atoms at an ester end thereof, wherein the (meth)acrylic resin has a glass transition point of not higher than −30° C., an antistatic agent, at least one additive selected from the group consisting of particles, a crosslinking agent, a polyol compound, a polyether compound, a defoaming agent, a coatability improver, a thickening agent, an organic lubricant, an ultraviolet absorber, an antioxidant, a foaming agent, a dye, and a pigment, and a solvent, wherein the adhesive layer has an adhesion strength to a polymethyl methacrylate plate of 1 to 500 mN/cm.

17. The adhesive film according to claim 16, wherein the crosslinking agent is at least one compound selected from the group consisting of a melamine compound, an isocyanate-based compound, an epoxy compound, an oxazoline compound, a carbodiimide-based compound, a silane coupling compound, a hydrazide compound and an aziridine compound.

18. The adhesive film according to claim 16, further comprising a functional layer formed on a surface of the polyester film which is opposite to the surface provided with the adhesive layer.

19. The adhesive film according to claim 16, wherein the antistatic agent is a polymer-type antistatic agent.

20. The adhesive film according to claim 19, wherein the polymer-type antistatic agent comprises a conductive polymer.

21. The adhesive film according to claim 16, wherein the adhesive layer has an adhesion strength to a polymethyl methacrylate plate of 7 to 300 mN/cm.

22. An adhesive film comprising a polyester film and an adhesive layer formed on at least one surface of the polyester film and having a thickness of 1 to 700 nm, in which the polyester film consists of a polyester, and at least one additive selected from the group consisting of particles selected from the group consisting of silica, calcium carbonate, magnesium carbonate, barium carbonate, calcium sulfate, calcium phosphate, magnesium phosphate, kaolin, aluminum oxide, zirconium oxide, and titanium oxide, an ultraviolet absorber, an antioxidant, an antistatic agent, a thermal stabilizer, and a lubricant, in which the adhesive layer is formed by applying a coating solution consisting of:

a (meth)acrylic resin containing a (meth)acrylate unit with an alkyl group having not less than 4 carbon atoms at an ester end thereof, wherein the (meth)acrylic resin has a glass transition point of not higher than −30°, an antistatic agent, at least one additive selected from the group consisting of particles, a crosslinking agent, a polyol compound, a polyether compound, a defoaming agent, a coatability improver, a thickening agent, an organic lubricant, an ultraviolet absorber, an antioxidant, a foaming agent, a dye, and a pigment, and a solvent, wherein the adhesive layer has an adhesion strength to a polymethyl methacrylate plate of 1 to 500 mN/cm.

23. The adhesive film according to claim 22, wherein the crosslinking agent is at least one compound selected from the group consisting of a melamine compound, an isocyanate-based compound, an epoxy compound, an oxazoline compound, a carbodiimide-based compound, a silane coupling compound, a hydrazide compound and an aziridine compound.

24. The adhesive film according to claim 22, further comprising a functional layer formed on a surface of the polyester film which is opposite to the surface provided with the adhesive layer.

25. The adhesive film according to claim 22, wherein the antistatic agent in the coating solution is a polymer-type antistatic agent.

26. The adhesive film according to claim 25, wherein the polymer-type antistatic agent comprises a conductive polymer.

27. The adhesive film according to claim 22, wherein the adhesive layer has an adhesion strength to a polymethyl methacrylate plate of 7 to 300 mN/cm.

* * * * *